US011415445B2

(12) United States Patent
Kono

(10) Patent No.: US 11,415,445 B2
(45) Date of Patent: Aug. 16, 2022

(54) PHYSICAL QUANTITY MEASUREMENT DEVICE AND METHOD FOR MANUFACTURING PHYSICAL QUANTITY MEASUREMENT DEVICE

(71) Applicant: DENSO CORPORATION, Kariya (JP)

(72) Inventor: Yasushi Kono, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/191,210

(22) Filed: Mar. 3, 2021

(65) Prior Publication Data

US 2021/0190561 A1    Jun. 24, 2021

Related U.S. Application Data

(63) Continuation of application No. PCT/JP2019/033531, filed on Aug. 27, 2019.

(30) Foreign Application Priority Data

Sep. 6, 2018 (JP) .............................. JP2018-167181

(51) Int. Cl.
    *G01F 1/684* (2006.01)
    *G01F 1/692* (2006.01)
    (Continued)

(52) U.S. Cl.
    CPC ....... *G01F 1/684* (2013.01); *F02M 35/10386* (2013.01); *G01F 1/6842* (2013.01);
    (Continued)

(58) Field of Classification Search
    CPC . G01F 1/684; G01F 1/69; G01F 1/692; G01F 1/6842; G01F 1/6845; G01F 5/00; F02M 35/10386
    See application file for complete search history.

(56) References Cited

U.S. PATENT DOCUMENTS 5,423,212 A * 6/1995 Manaka ................ G01F 1/6845
                                                      73/204.26
9,791,306 B2 * 10/2017 Tashiro .................. H05K 3/305
(Continued)

FOREIGN PATENT DOCUMENTS

DE      4219454 A1 * 12/1993   ............. G01F 1/684
JP   2005098796 A  *  4/2005
(Continued)

OTHER PUBLICATIONS

U.S. Appl. No. 17/191,131, to Kono, entitled "Physical Quantity Measurement Device", filed Mar. 3, 2021 (98 pages).

*Primary Examiner* — Ryan D Walsh
(74) *Attorney, Agent, or Firm* — Nixon & Vanderhye P.C.

(57) ABSTRACT

A physical quantity measurement device includes a physical quantity detector and a support plate part superposed on a back surface of the physical quantity detector to support the physical quantity detector. The physical quantity detector includes a recessed part on the back surface, and a membrane part defining a bottom surface of the recessed part and being provided with a detection element for detecting a physical quantity of a fluid in a measurement low path. An area of the support plate part covering the recessed part includes a communication hole communicating with the recessed part. A peripheral edge portion of a hole opening, which is an end of the communication hole adjacent to the recessed part, is spaced apart, toward the inside, from a peripheral edge portion of a recess opening, which is an end of the recessed part adjacent to the support plate part.

12 Claims, 28 Drawing Sheets

(51) Int. Cl.
*G01F 1/696* (2006.01)
*G01F 5/00* (2006.01)
*F02M 35/10* (2006.01)

(52) U.S. Cl.
CPC ............ *G01F 1/6845* (2013.01); *G01F 1/692* (2013.01); *G01F 1/696* (2013.01); *G01F 5/00* (2013.01)

(56) References Cited

U.S. PATENT DOCUMENTS

2012/0035866 A1\* 2/2012 Qasimi .................... G01F 1/40
  702/47
2016/0282163 A1   9/2016 Tashiro et al.

FOREIGN PATENT DOCUMENTS

| | | | | |
|---|---|---|---|---|
| JP | 2014-001985 | | 1/2014 | |
| JP | 2014-001992 | | 1/2014 | |
| JP | 2014001969 A | \* | 1/2014 | |
| JP | 2015158521 A | \* | 9/2015 | |
| JP | 2015232514 A | \* | 12/2015 | ........... F02D 41/144 |
| WO | WO-2014002738 A1 | \* | 1/2014 | ................ G01P 5/12 |
| WO | WO-2016039019 A1 | \* | 3/2016 | ............. G01F 1/684 |

\* cited by examiner

PHYSICAL QUANTITY MEASUREMENT DEVICE AND METHOD FOR MANUFACTURING PHYSICAL QUANTITY MEASUREMENT DEVICE

CROSS REFERENCE TO RELATED APPLICATIONS

The present application is a continuation application of International Patent Application No. PCT/JP2019/033531 filed on Aug. 27, 2019, which designated the U.S. and claims the benefit of priority from Japanese Patent Application No. 2018-167181 filed on Sep. 6, 2018. The entire disclosures of all of the above applications are incorporated herein by reference.

TECHNICAL FIELD

The present disclosure relates to a physical quantity measurement device and a method for manufacturing a physical quantity measurement device.

BACKGROUND

As a physical quantity measurement device for measuring a physical quantity of a fluid, it is known a thermal flow meter that has a flow rate detection element for detecting a flow rate of air and a metal substrate on which the flow rate detection element is mounted. In such a thermal flow meter, the flow rate detection element is formed with a cavity on a back surface side of a thinned diaphragm. The metal substrate is laid on a back surface of the flow rate detection element so as to cover the opening of the cavity. The metal substrate is formed with a ventilation hole to communicate with the cavity, so that air pressure acting on the front surface of the diaphragm and air pressure acting on the back surface of the diaphragm are equal. The peripheral edge of the ventilation hole is overlapped with the peripheral edge of the cavity on the back surface of the flow rate detection element.

SUMMARY

The present disclosure describes a physical quantity measurement device and a method for manufacturing a physical quantity measurement device, in which detection accuracy of a physical quantity detection part is improved by forming a communication hole on a support plate part supporting the physical quantity detection part, and which are capable of suppressing burrs of the support plate part, even if the burrs are caused in accordance with the formation of the communication hole, from contacting with the physical quantity detection part.

DETAILED DESCRIPTION

Figure 1:
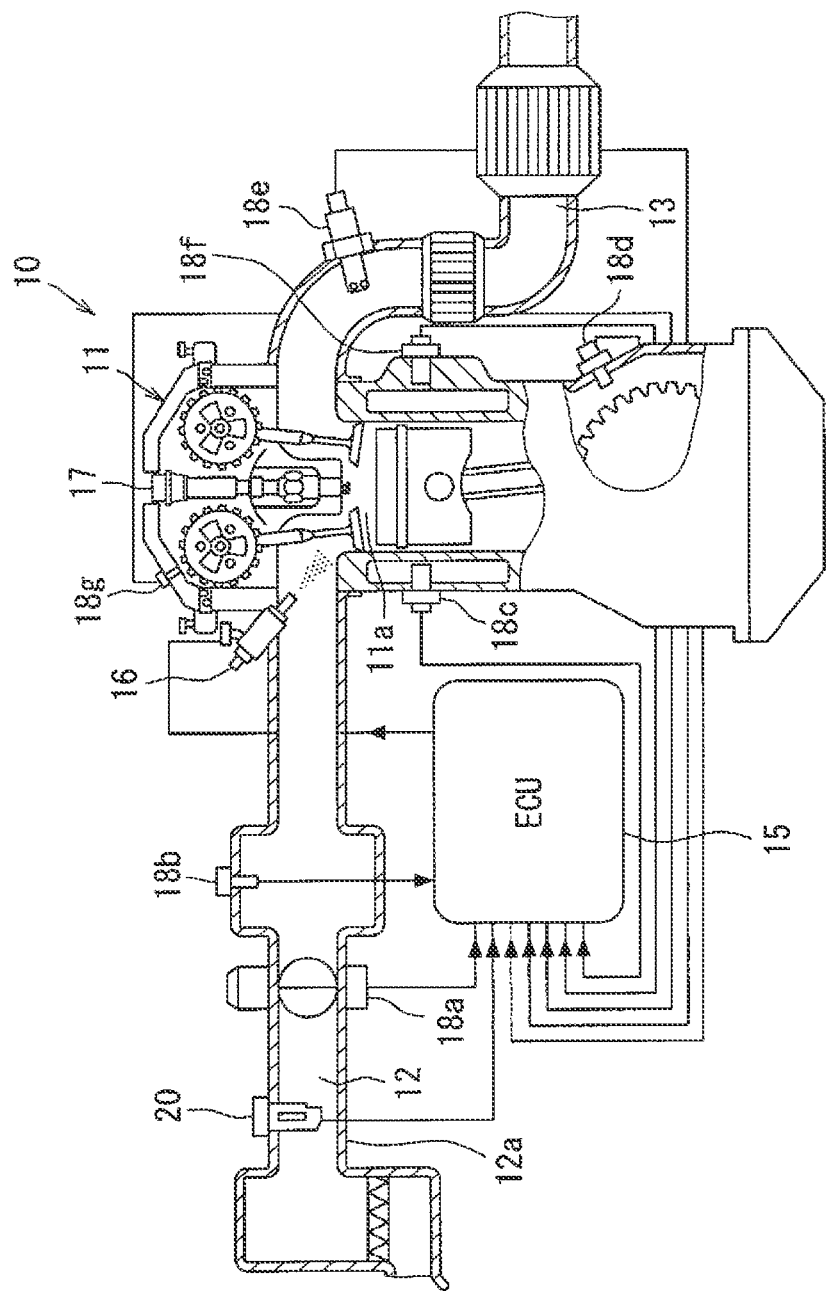
FIG. 1 is a diagram showing a configuration of a combustion system according to a first embodiment.

In a case where a ventilation hole is formed in a metal substrate by punching or the like, burrs, which are unnecessary protrusions, may remain on the peripheral edge of the ventilation hole. If the peripheral edge of the ventilation hole of the metal substrate is overlapped on the back surface of the flow rate detection element, there is a concern that the burrs remaining on the peripheral edge of the ventilation hole may come into contact with the back surface of the flow rate detection element. If the burrs are in contact with the flow rate detection element, the flow rate detection element may be damaged.

According to a first aspect of the present disclosure, a physical quantity measurement device for measuring a physical quantity of a fluid includes a measurement flow path through which the fluid flows, a physical quantity detector for detecting the physical quantity of the fluid in the measurement flow path, and a support plate part supporting the physical quantity detector in a state of being overlapped on a back surface, as one surface, of the physical quantity detector. The physical quantity detector includes a recessed part recessed from the back surface of the physical quantity detector, and a membrane part that forms a bottom surface of the recessed part in the physical quantity detector and provided with a detection element for detecting the physical quantity of the fluid. The support plate part is provided with a communication hole in an area covering the recessed part. The communication hole passes through the support plate part to communication with the recessed part. A peripheral edge portion of a hole opening, which is an end of the communication hole adjacent to the recessed part, is spaced apart, toward the inside, from a peripheral edge portion of a recess opening, which is an end of the recessed part adjacent to the support plate part.

According to the first aspect, the peripheral edge portion of the hole opening provided in the support plate part is spaced apart, toward the inside, from the peripheral edge portion of the recess opening provided in the physical quantity detector. In this case, even if burrs are formed on the peripheral edge portion of the communication hole when the communication hole is formed in the support plate part during the manufacture of the physical quantity measurement device, the burrs exist at positions spaced apart inwardly from the peripheral edge portion of the recess opening. Therefore, it is possible to suppress the burrs from coming into contact with the back surface of the physical quantity detector. Further, since the communication hole is formed in the support plate part, a pressure difference is less likely to occur between the inside and the outside of the recessed part. Therefore, it is possible to suppress degradation of detection accuracy of the physical quantity detector due to deformation of the membrane part caused by the pressure difference between the inside and the outside of the recessed part. As such, it is possible to improve the detection accuracy of the physical quantity detector by forming the communication hole in the support plate part, as well as to suppress the burrs from coming into contact with the physical quantity detector. As a result, it is less likely that the physical quantity detector will be damaged due to contact with the burrs.

According to a second aspect of the present disclosure, a method for manufacturing a physical quantity measurement device for measuring a physical quantity of a fluid, includes: forming a physical quantity detector having a plate shape and including a recessed part recessed from a back surface, as one surface, of the physical quantity detector, and a membrane part defining a bottom surface of the recessed part in the physical quantity detector and being provided with a detection element for detecting the physical quantity of the fluid; forming a communication hole passing through a support plate part for supporting the physical quantity detector by punching the support plate part from a back surface as a plate surface opposite to the physical quantity detector; and attaching the physical quantity detector to a front plate surface as a surface of the support plate part opposite to the back plate surface so that the communication hole is in communication with the recessed part in a state where a peripheral edge portion of a hole opening, which is an end of the communication hole on a side adjacent to the support plate part, is spaced apart, toward the inside, from a peripheral edge portion of a recess opening, which is an end of the recessed part adjacent to the support plate part.

According to the second aspect, since the communication hole is formed by punching the support plate part from the back surface thereof, it is concerned that burrs generated by the punching of the support plate part may remain on the peripheral edge portion of the communication hole on the front surface of the support plate part. On the other hand, the physical quantity detector is attached to the front surface of the support plate part so that the peripheral edge portion of the hole opening formed in the support plate part is spaced apart, toward the inside, from the peripheral edge portion of the recess opening formed in the physical quantity detector. Therefore, even if the burrs remain on the peripheral edge portion of the communication hole on the front surface of the support plate part, the burrs are present at positions spaced apart inwardly from the peripheral edge portion of the recess opening. For that reason, the similar effects to those of the first embodiment can be obtained.

Hereinafter, multiple embodiments of the present disclosure will be described with reference to the drawings. Throughout the embodiment, corresponding components will be designated with the same reference numbers, and descriptions thereof will not be repeated. When configurations are described only partly in the respective embodiments, the configurations of the embodiments previously described may be applied to the rest of the configurations. Further, not only the combinations of the configurations explicitly shown in the description of the respective embodiments, but also the configurations of the multiple embodiments can be partially combined even though they are not explicitly shown as long as there is no difficulty in the combination in particular. It should be understood that the unexplained combinations of the structural components recited in the following embodiments and modifications thereof are assumed to be disclosed in this description by the following explanation.

First Embodiment

A combustion system 10 shown in FIG. 1 includes an internal combustion engine 11 such as a gasoline engine, an intake passage 12, an exhaust passage 13, an airflow meter 20, and an ECU 15, and the combustion system 10 is mounted on a vehicle, for example. The airflow meter 20 is disposed in the intake passage 12 to measure a physical quantity such as a flow rate, a temperature, a humidity, or a pressure of an intake air supplied to the internal combustion engine 11. The airflow meter 20 corresponds to a "physical quantity measurement device" that measures a fluid, such as intake air. The intake air is a gas to be supplied to a combustion chamber 11a of the internal combustion engine 11. In the combustion chamber 11a, a mixture of the intake air and a fuel is ignited by an ignition plug 17.

The ECU (Engine Control Unit) 15 is a controller for controlling an operation of the combustion system 10. The ECU 15 is a calculation processing circuit including a processor, a storage medium such as a RAM, a ROM and a flash memory, a microcomputer including an input and output unit, a power supply circuit, and the like. The ECU 15 receives a sensor signal output from the airflow meter 20, sensor signals output from a large number of in-vehicle sensors, and the like. The ECU 15 uses measurement results of the airflow meter 20 to perform an engine control such as control of a fuel injection amount and an EGR amount of an injector 16. The ECU 15 is a controller that controls an operation of the internal combustion engine 11, and the combustion system 10 may be referred to as an engine control system. The ECU 15 corresponds to an external device.

The combustion system 10 has a plurality of measurement units as in-vehicle sensors. As the measurement units, in addition to the airflow meter 20, a throttle sensor 18a, an intake pressure sensor 18b, a water temperature sensor 18c, a crank angle sensor 18d, an air-fuel ratio sensor 18e, a knock sensor 18f, a cam angle sensor 18g, and the like are included. Each of these measurement units is electrically connected to the ECU 15 and outputs a detection signal to the ECU 15. The airflow meter 20 is provided in the intake passage 12 and at a position upstream of a throttle valve to which the throttle sensor 18a is attached.

Figure 3:
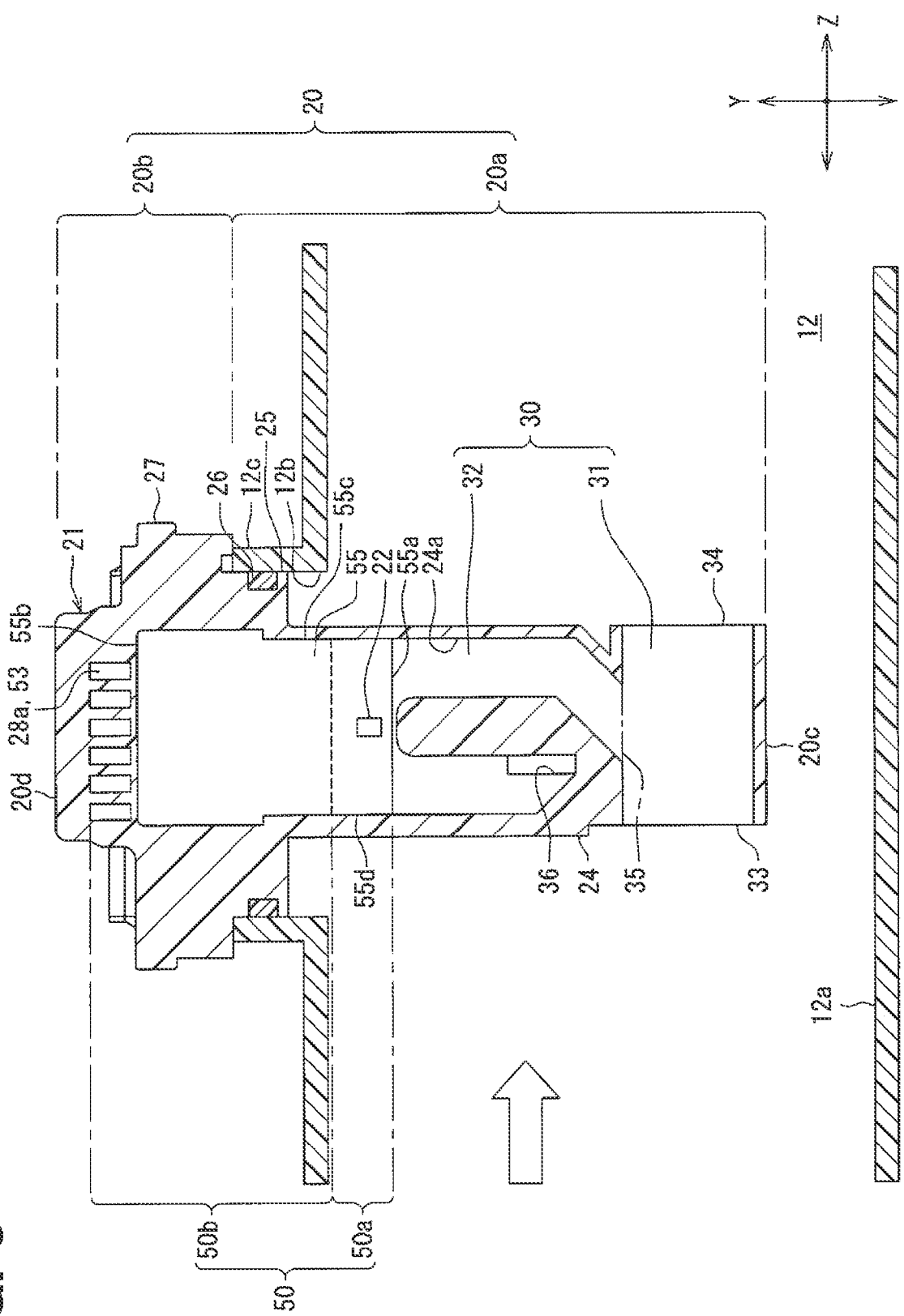
FIG. 3 is a vertical cross-sectional view of the airflow meter in a state of being attached to an intake pipe.

As shown in FIG. 3, the airflow meter 20 is attached to an intake pipe 12a such as a duct for forming the intake passage 12. The intake pipe 12a has an airflow meter insertion hole 12b as a through hole passing through an outer peripheral portion of the intake pipe 12a. An annular pipe flange 12c is provided to the airflow insertion hole 12b, and the pipe flange 12c is included in the intake pipe 12a. The airflow meter 20 is inserted into the pipe flange 12c and the airflow insertion hole 12b so as to enter and locate in the intake passage 12, and is fixed to the intake pipe 12a and the pipe flange 12c in this state.

In the present embodiment, a width direction X, a height direction Y, and a depth direction Z are defined for the airflow meter 20, and those directions X, Y, and Z are orthogonal to each other. The airflow meter 20 extends in the height direction Y, and the intake passage 12 extends in the depth direction Z. The airflow meter 20 includes an inner unit 20a positioned inside the intake passage 12 and an outer unit 20b protruding outward from the pipe flange 12c without being in the intake passage 12. The inner unit 20a and the outer unit 20b are aligned in the height direction Y. In the airflow meter 20, of one pair of end surfaces 20c and 20d aligned in the height direction Y, one being included in the inner unit 20a is referred to as an airflow tip end surface 20c, and the other being included in the outer unit 20b is referred to as an airflow base end surface 20d. The airflow tip end surface 20c and the airflow base end surface 20d are orthogonal to the height direction Y. Further, the tip end face of the pipe flange 12c is also orthogonal to the height direction Y.

Figure 2:
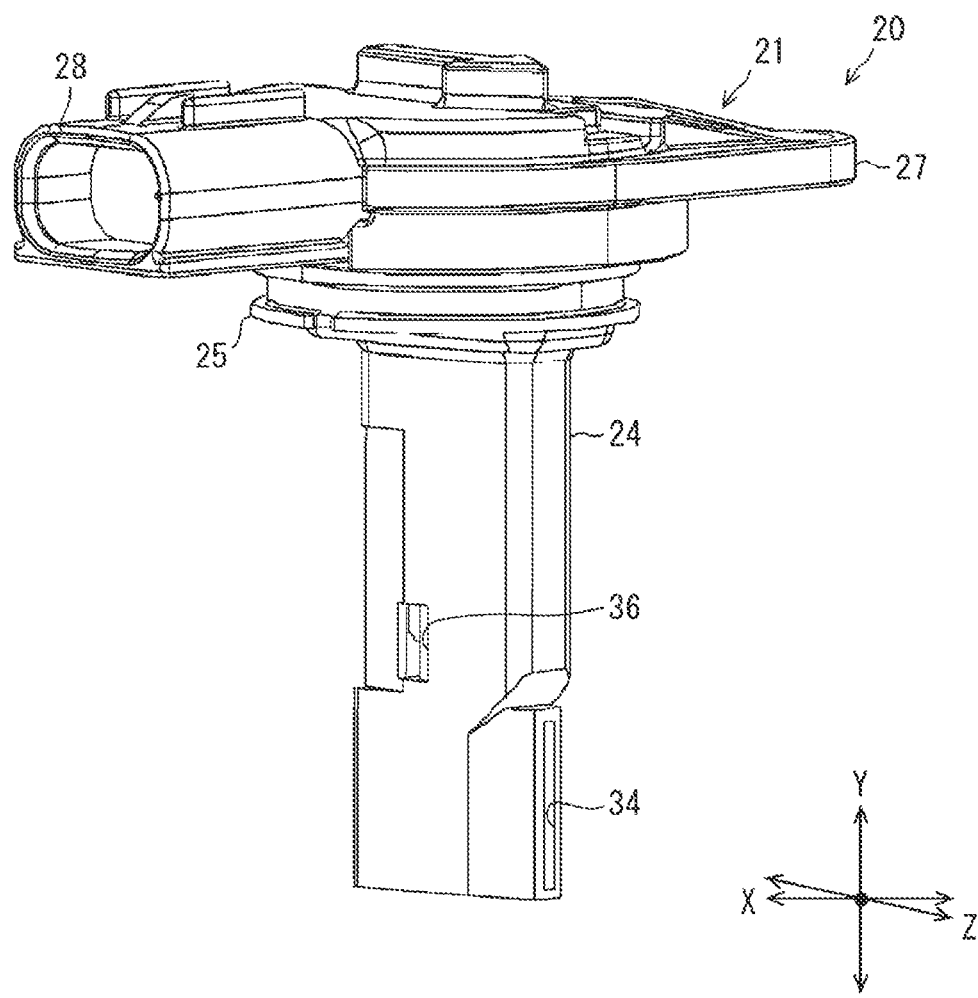
FIG. 2 is a perspective view of an airflow meter.

As shown in FIGS. 2 and 3, the airflow meter 20 includes a housing 21, a flow rate detection unit 22 that detects the flow rate of intake air, and an intake air temperature sensor (not shown) that detects the temperature of intake air. The housing 21 is made of, for example, a resin material. The housing 21 of the airflow meter 20 is attached to the intake pipe 12a such that the flow rate detection unit 22 can come in contact with the intake air flowing through the intake passage 12. The housing 21 has a housing main body 24, a ring holding portion 25, a flange portion 27, and a connector portion 28, and an O-ring 26 is attached to the ring holding portion 25.

The housing main body 24 is formed into a cylindrical shape as a whole. In the housing 21, the ring holding portion 25, the flange portion 27, and the connector portion 28 are integral with the housing main body 24. The ring holding portion 25 is included in the inner unit 20a, and the flange portion 27 and the connector portion 28 are included in the outer unit 20b.

The ring holding portion 25 is provided inside the pipe flange 12c, and holds the O-ring 26 so as not to be displaced in the height direction Y. The O-ring 26 is a sealing member for sealing the intake passage 12 inside the pipe flange 12c, and is in close contact with both an outer peripheral surface of the ring holding portion 25 and an inner peripheral surface of the pipe flange 12c. The flange portion 27 is formed with a fixing hole such as a screw hole for fixing a fixing tool such as a screw for fixing the airflow meter 20 to the intake pipe 12a. The connector portion 28 is a protection unit for protecting a connector terminal 28a electrically connected to the flow rate detection unit 22.

The flow rate detection unit 22 is provided in an internal space 24a of the housing main body 24, and the intake air temperature sensor is provided outside the housing 21. The intake air temperature sensor includes a temperature sensing element for sensing a temperature of the intake air, a lead wire extending from the temperature sensing element, and an intake air temperature terminal connected to the lead wire. The housing 21 includes a support portion that supports the intake air temperature sensor, and the support portion is provided on an outer peripheral side of the housing 21.

The housing main body 24 forms a bypass flow path 30 into which a part of the intake air flowing through the intake passage 12 flows. The bypass flow path 30 is disposed in the inner unit 20a of the airflow meter 20. The bypass flow path 30 includes a passage flow path 31 and a measurement flow path 32. The passage flow path 31 and the measurement flow path 32 are defined by an internal space 24a of the housing main body 24. The intake passage 12 may be referred to as a main passage, and the bypass flow path 30 may be referred to as a sub passage.

The passage flow path 31 passes through the housing main body 24 in the depth direction Z. The passage flow path 31 has an inflow port 33 as an upstream end and an outflow port 34 as a downstream end. The measurement flow path 32 is a branch flow path branched from an intermediate portion of the passage flow path 31, and the flow rate detection unit 22 is disposed in the measurement flow path 32. The measurement flow path 32 has a measurement inlet 35, which is an upstream end of the measurement flow path 32, and a measurement outlet 36, which is a downstream end of the measurement flow path 32. A portion where the measurement flow path 32 branches from the passage flow path 31 is a boundary between the passage flow path 31 and the measurement flow path 32, and the measurement inlet 35 is included in the boundary. The measurement inlet 35 corresponds to a branch inlet, and the measurement outlet 36 corresponds to a branch outlet. The boundary between the passage flow path 31 and the measurement flow path 32 may also be referred to as a flow path boundary.

The flow rate detection unit 22 is a thermal type flow rate sensor having a heater. The flow rate detection unit 22 outputs a detection signal according to a temperature change caused by heat generation of the heater. The flow rate detection unit 22 is a rectangular parallelepiped chip component. The flow rate detection unit 22 may also be referred to as a sensor chip. The flow rate detection unit 22 corresponds to a physical quantity detector that detects the flow rate of the intake air as a physical quantity of fluid.

The airflow meter 20 has a sensor sub-assembly including the flow rate detection unit 22, and the sensor sub-assembly is referred to as a sensor SA 50. The sensor SA 50 is accommodated in the internal space 24a of the housing main body 24. The sensor SA 50 may also be referred to as a detection unit, a measurement unit, or a sensor package.

The sensor SA 50 has an inward part 50a entering and locating in the measurement flow path 32 in the internal space 24a, and an outward part 50b protruding from the measurement flow path 32 without entering the measurement flow path 32. The inward part 50a and the outward part 50b are aligned in the height direction Y, and the flow rate detection unit 22 is included in the inward part 50a.

Figure 5:
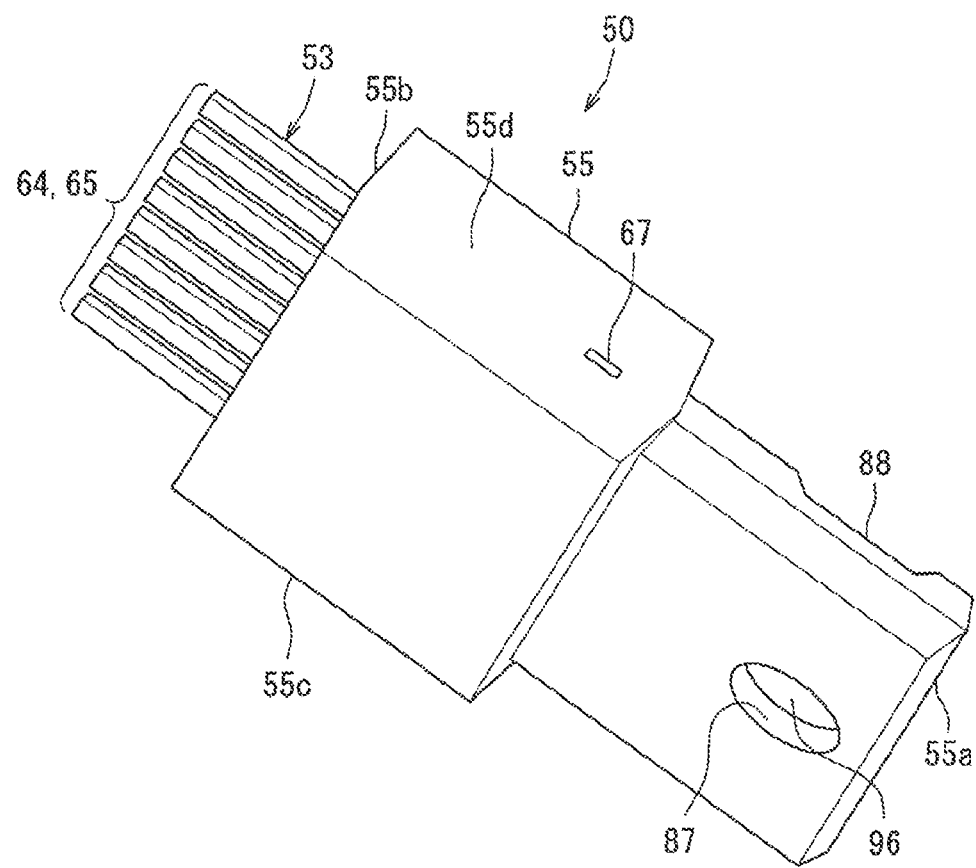
FIG. 5 is a perspective view of the sensor SA when viewed from a back side.
Figure 5:
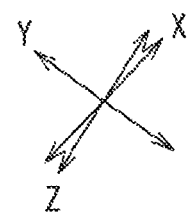
Figure 6:
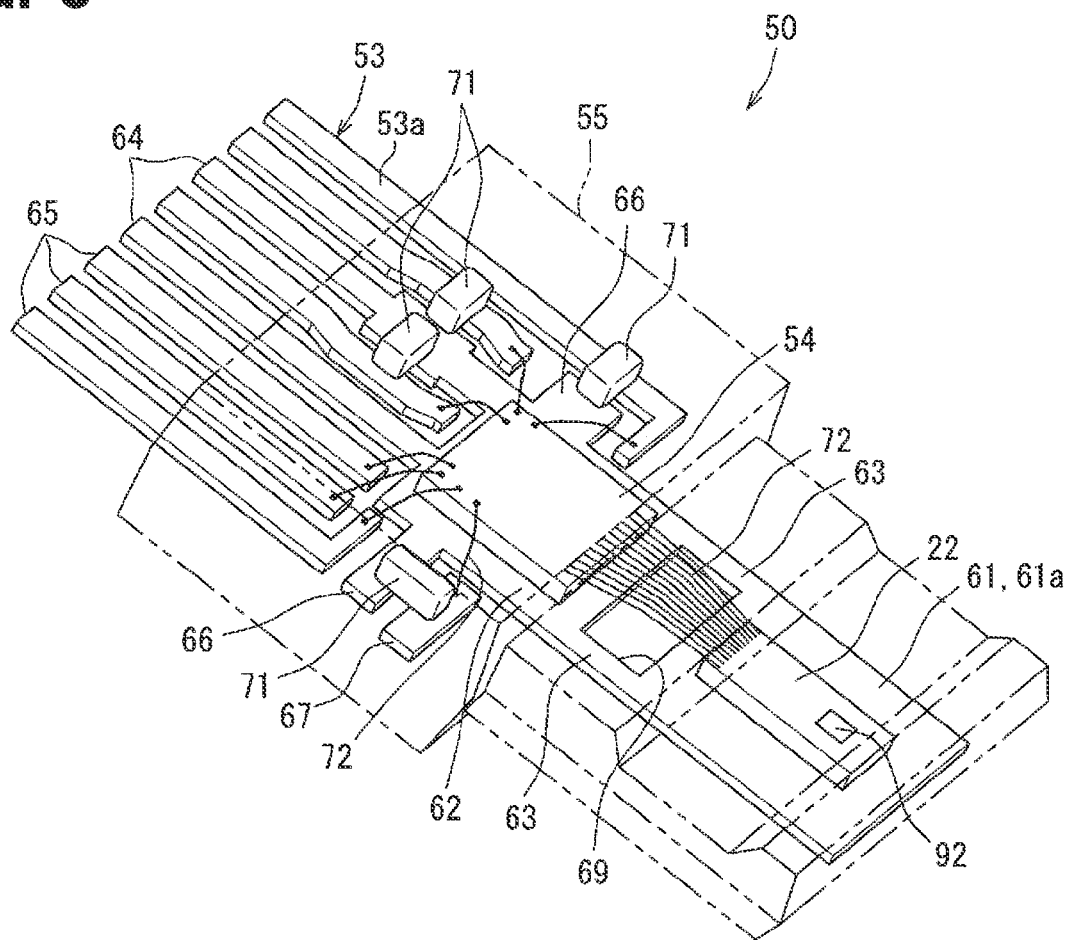
FIG. 6 is a perspective view for showing an internal structure of the sensor SA.
Figure 7:
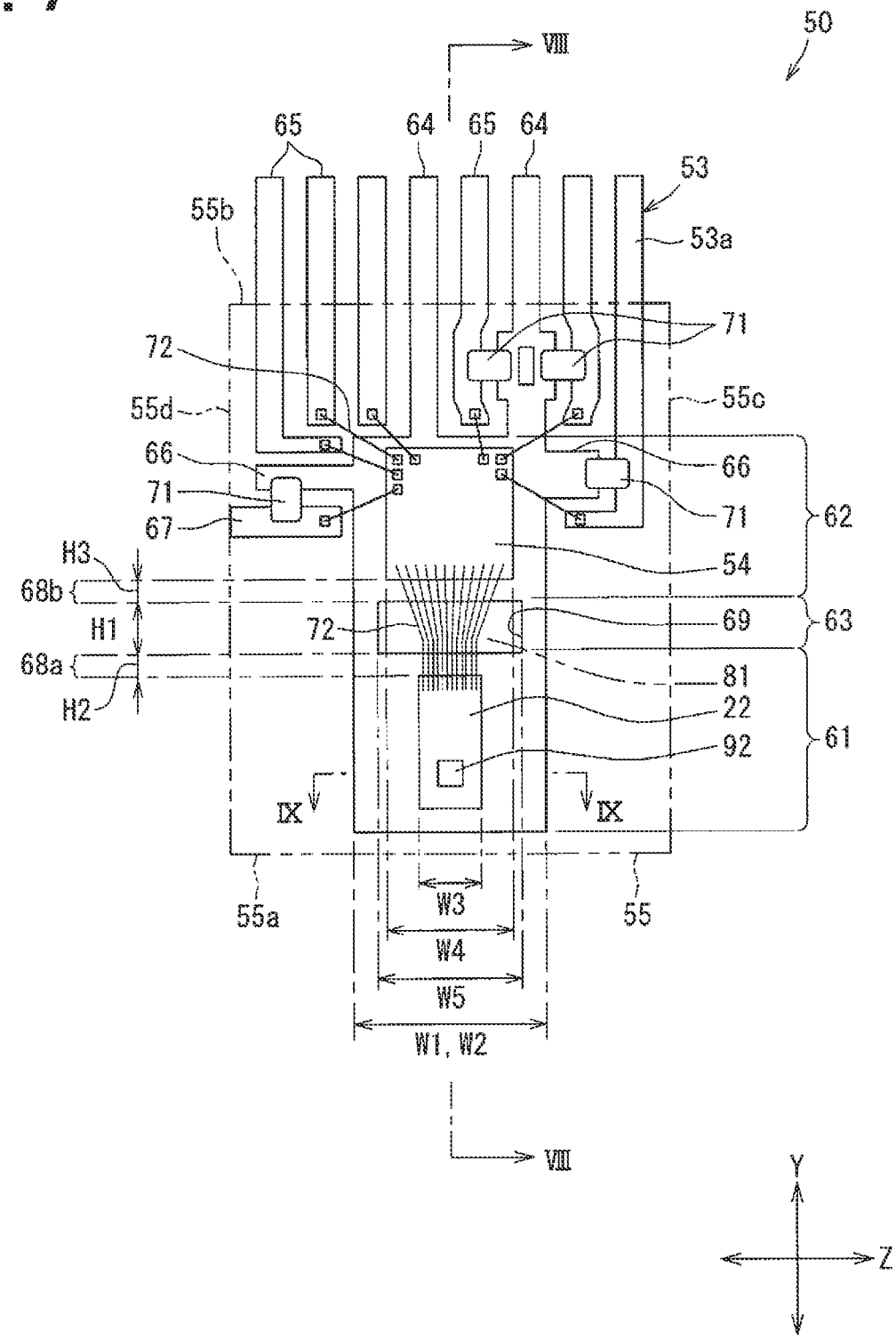
FIG. 7 is a front view for showing the internal structure of the sensor SA.

As shown in FIGS. 4 to 7, the sensor SA 50 includes an SA substrate 53 on which the flow rate detection unit 22 is mounted, a flow rate processor 54 electrically connected to the flow rate detection unit 22, and a molded part 55 covering the SA substrate 53, and the flow rate detection unit 22, and the flow rate processor 54. The flow rate processor 54 receives a detection signal from the flow rate detection unit 22 as the detection result of the flow rate detection unit 22. The flow rate detection unit 22 corresponds to the physical quantity processor. Further, the SA substrate 53 corresponds to the support plate part, and the molded part 55 corresponds to a body that protects the physical quantity detector and the physical quantity processor. The SA substrate may also be referred to as a lead frame. In FIG. 7, the molded part 55 is shown by a virtual line in order to illustrate the internal structure of the sensor SA 50.

The molded part 55 is formed into a plate shape as a whole. As shown in FIG. 3, in the molded part 55, of one pair of end surfaces 55a and 55b arranged in the height direction Y, one being included in the inward part 50a is referred to as a mold tip end surface 55a and the other being included in the outward part 50b is referred to as a mold base end surface 55b. Of one pair of surfaces 55c, 55d facing each other on opposite sides of the mold tip end surface 55a and the mold base end surface 55b, one is referred to as a mold upstream surface 55c, and the other is referred to as a mold downstream surface 55d. The sensor SA 50 is arranged in the internal space 24a with an orientation such that the mold tip end surface 55a is adjacent to the airflow tip end surface 20c, and the mold upstream surface 55c is arranged upstream from the mold downstream surface 55d in the measurement flow path 32.

The mold upstream surface 55c of the sensor SA 50 is arranged on the upstream side of the mold downstream surface 55d in the measurement flow path 32. A flow direction of air in a part of the measurement flow path 32 where the flow rate detection unit 22 is disposed is opposite to a flow direction of air in the intake passage 12. Therefore, the mold upstream surface 55c is located downstream of the mold downstream surface 55d in the intake passage 12.

In FIGS. 6 and 7, the SA substrate 53 is made of a metal material or the like, and formed into a plate shape as a whole. The SA substrate 53 is a conductive substrate. A plate surface of the SA substrate 53 is orthogonal to the width direction X and extends in the height direction Y and the depth direction Z. The SA substrate 53 includes a detection frame 61 that supports the flow rate detection unit 22, a processor frame 62 that supports the flow rate processor 54, a connection frame 63 that connects these frames 61 and 62, and lead terminals 64, 65 that are connected to the connector terminal 28a. The detection frame 61 corresponds to a detector support portion, the processor frame 62 corresponds to a processor support portion, and the connection frame 63 corresponds to a connection support portion. Further, the detection frame 61 corresponds to a portion of the SA substrate 53 covering a recessed part, and thus is also referred to as a covering portion.

The detection frame 61 and the processor frame 62 are each formed into a rectangular shape as a whole, and their respective plate surfaces are orthogonal to the width direction X. The detection frame 61 is provided at a position separated from the processor frame 62 toward the mold tip end surface 55a. A pair of connection frames 63 are provided between the detection frame 61 and the processor frame 62 in the height direction Y, and each of the connection frames 63 is in a state of bridging the detection frame 61 and the processor frame 62. The pair of connection frames 63 are arranged in the depth direction Z in a state of being separated from each other.

The SA substrate 53 is formed with a substrate hole 69 as a through hole that passes through the SA substrate 53 in the width direction X. The substrate hole 69 is located between the detection frame 61 and the processor frame 62 in the height direction Y, and provides a separation portion between the frames 61 and 62. Further, the substrate hole 69 is located between the pair of connection frames 63 in the depth direction Z, and provides a separation portion between the connection frames 63. The substrate hole 69 is arranged between the flow rate detection unit 22 and the flow rate processor 54 in the height direction Y. Since the SA substrate 53 is formed with the substrate hole 69, in regard to the cross section defined in a direction orthogonal to the height direction Y, the total cross-sectional area of the pair of connection frames 63 is smaller than the cross-sectional area of each of the detection frame 61 and the processor frame 62. Therefore, the connection frame 63 is less likely to transfer heat than each of the detection frame 61 and the processor frame 62. The substrate hole 69 corresponds to the through portion.

Figure 8:
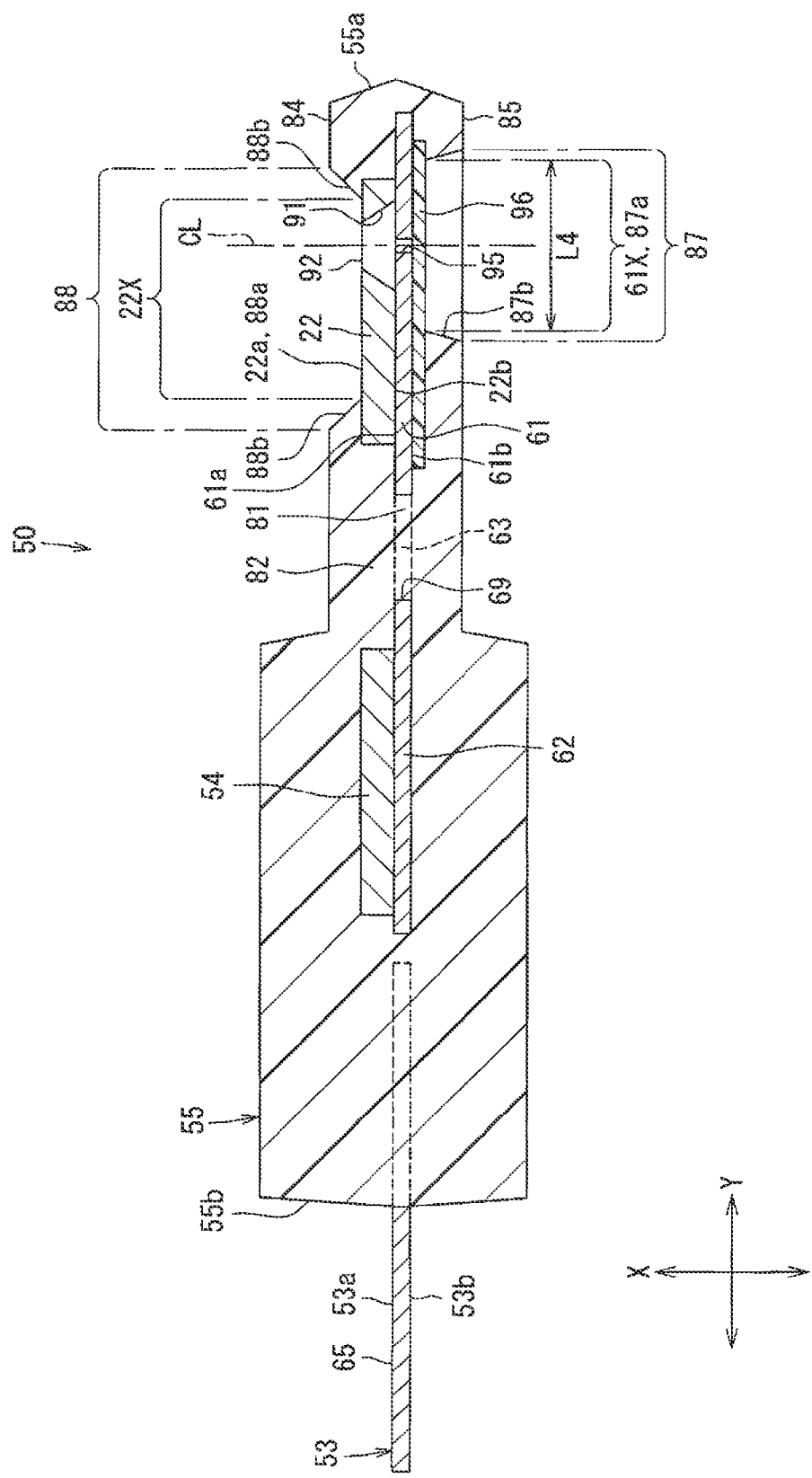
FIG. 8 is a cross-sectional view taken along a line VIII-VIII in FIG. 7.

As shown in FIG. 8, both the flow rate detection unit 22 and the flow rate processor 54 are mounted on one of the plate surfaces of the SA substrate 53. The one of the plate surfaces on which the flow rate detection unit 22 and the flow rate processor 54 are mounted is referred to as a front surface 53a, and the other of the plate surfaces opposite to the front surface 53a is referred to as a back surface 53b. The front surface 53a of the SA substrate 53 includes the front surface 61a of the detection frame 61, and the back surface 53b of the SA substrate 53 includes the back surface 61b of the detection frame 61. The front surface 61a and the back surface 61b extend parallel to each other. In regard to the detection frame 61, the front surface 61a corresponds to the front plate surface, and the back surface 61b corresponds to the back plate surface.

The flow rate detection unit 22 is formed into a plate shape. A plate surface of the flow rate detection unit 22 opposite to the detection frame 61 is referred to as a front surface 22a, and a plate surface of the flow rate detection unit 22 opposite to the front surface 22a is referred to as a back surface 22b. Both the front surface 22a and the back surface 22b extend parallel to each other. In the sensor SA 50, the back surface 22b of the flow rate detection unit 22 is overlapped with the front surface 61a of the detection frame 61.

Returning to the description of FIGS. 6 and 7, opposite side ends of the substrate hole 69 are located at positions more to outside than both of the flow rate detection unit 22 and the flow rate processor 54 in the depth direction Z. In this case, the pair of connection frames 63 are not located at positions interposed between the flow rate detection unit 22 and the flow rate processor 54, but are located at positions shifted from the flow rate detection unit 22 and the flow rate processor 54 laterally in each of the width direction X and the depth direction Z.

The detection frame 61, the processor frame 62, and the substrate hole 69 are aligned in the height direction Y, and the center lines of the detection frame 61, the processor frame 62, and the substrate hole 69 coincide with a virtual axis extending in the height direction Y. In the depth direction Z, the flow rate detection unit 22 is located at the center position of the detection frame 61, and the flow rate processor 54 is located at the center position of the processor frame 62.

In the depth direction Z, the width dimension W1 of the detection frame 61 and the width dimension W2 of the processor frame 62 are the same. Further, the width dimension W3 of the flow rate detection unit 22 is smaller than the width dimension W4 of the flow rate processor 54, and the width dimension W5 of the substrate hole 69 is larger than the width dimensions W3 and W4. The width dimension W5 of the substrate hole 69 corresponds to a separation distance between the pair of connection frames 63.

The substrate hole 69 has the length dimension H1 in the height direction Y such that heat is unlikely to be transferred between the detection frame 61 and the processor frame 62. The detection frame 61 has a detection extension portion 68a extending so as to protrude toward the substrate hole 69 from the flow rate detection unit 22, and the processor frame 62 has a processor extension portion 68b extending so as to protrude toward the detection frame 61 from the flow rate processor 54. In this case, the length dimension H1 of the substrate hole 69 is larger than each of the extension dimension H2 of the detection extension portion 68a from the flow rate detection unit 22 and the extension dimension H3 of the processor extension portion 68b from the flow rate processor 54. Further, the length dimension H1 of the substrate hole 69 is larger than the sum of the extension dimensions H2 and H3. Further, in the height direction Y, the substrate hole 69 is arranged in the middle of the flow rate detection unit 22 and the flow rate processor 54, and the extension dimension H2 of the detection extension portion 68a and the extension dimension H3 of the processor extension portion 68b have almost the same value.

A part of each of the lead terminals 64 and 65 projects from the mold base end surface 55b to the outside of the molded part 55. The part of each of the lead terminals 64 and 65 projecting outside of the molded part 55 extends in the height direction Y from the mold base end surface 55b, and is connected to the connector terminal 28a in the internal space 24a of the housing main body 24. In this case, the back surface 53b of the SA substrate 53 includes the back surfaces of the lead terminals 64 and 65, and the back surfaces of the lead terminals 64 and 65 are in contact with the connector terminal 28a.

Of the lead terminals 64 and 65, the ground lead terminal 64 extends from the processor frame 62 and is electrically connected to the ground terminal in the sensor SA 50. In this case, the detection frame 61 and the connection frame 63 are both grounded via the processor frame 62. The ground lead terminal 64 corresponds to a support terminal.

The circuit lead terminal 65 is electrically connected to the flow rate processor 54 while being spaced from the processor frame 62 inside the molded part 55. A plurality of ground lead terminals 64 and a plurality of circuit lead terminals 65 are provided. The plurality of circuit lead terminals 65 include a power supply terminal of the sensor SA 50 that supplies electric power to the power supply terminal, and a signal terminal of the sensor SA 50 that outputs and receives a signal to and from the signal terminal.

The sensor SA 50 has a protection chip 71 that protects the flow rate processor 54 from noise. The protection chip 71 is a chip component having a protection circuit including a capacitor. The protection chip 71 is provided in a state of bridging the ground lead terminal 64 and the circuit lead terminal 65 inside the molded part 55.

The SA substrate 53 has protection frames 66 and 67 to which the protection chip 71 is attached. Of the protection frames 66 and 67, a ground protection frame 66 extends from the processor frame 62. A circuit protection frame 67 is electrically connected to the flow rate processor 54 while being spaced from the processor frame 62 inside the molded part 55. The protection chip 71 is provided in a state of bridging the ground protection frame 66 and the circuit protection frame 67 or the circuit lead terminal 65.

The flow rate processor 54 has a drive circuit such as a digital circuit (see FIG. 11) that performs various processes. The flow rate processor 54 is a rectangular parallelepiped chip component. The flow rate processor 54 may also be referred to as a circuit chip. The flow rate processor 54 is electrically connected to the flow rate detection unit 22, the circuit lead terminal 65, and the circuit protection frame 67 via bonding wires 72. The molded part 55 covers the protection chip 71 and the bonding wires 72, in addition to the flow rate detection unit 22 and the flow rate processor 54, so as to protect the flow rate detection unit 22, the flow rate processor 54, the protection chip 71 and the bonding wires 72. In this case, the molded part 55 may also be referred to as a protection body.

The molded part 55 is a molded resin of such as a polymer resin molded by a molding method, and has an electrical insulation property and a heat insulation property higher than those of the SA substrate 53. The molded part 55 integrally seals the flow rate processor 54, the protection chip 71, the bonding wire 72, and the like.

As shown in FIG. 8, the molded part 55 has a frame regulation portion 81 that regulates heat transfer from the processor frame 62 to the detection frame 61. The frame regulation portion 81 is a portion of the molded part 55 that is located in the substrate hole 69, and is in a state of being filled inside the substrate hole 69. Therefore, the frame regulation portion 81 has the same size and shape as the substrate hole 69. For example, in the depth direction Z, the width dimension of the frame regulation portion 81 is the same as the width dimension W5 of the substrate hole 69. The frame regulation portion 81 is arranged side by side with the connection frames 63 in the depth direction Z. In this case, the frame regulation portion 81 and the connection frames 63 are arranged side by side along the plate surface of the SA substrate 53. The frame regulation portion 81 corresponds to a heat transfer regulation portion.

When being electrically conducted and performing various processes, the flow rate processor 54 may generate heat. When this heat is transferred to the flow rate detection unit 22, it is concerned that detection accuracy of the flow rate detection unit 22 may degrade. In particular, when the power is turned on, such as when an ignition switch is turned on, the flow rate processor 54 begins to generate heat as the flow rate processor 54 starts to drive. In this case, since the flow rate processor 54 shifts from the state in which heat is not generated to the state in which heat is generated, the temperature increase of the flow rate processor 54 is likely to be large. Therefore, the detection value of the flow rate detection unit 22 may be likely to be unstable until the temperature of the flow rate detection unit 22 stabilizes at a temperature corresponding to the heat transmitted from the flow rate processor 54. As a result, the airflow meter 20 are likely to have poor activation characteristics when the power is turned on, and the responsiveness of the flow rate detection unit 22 is likely to decrease for a while after the power is turned on.

On the other hand, in the present embodiment, as described above, since the frame regulation portion 81 is provided in the entirety of the substrate hole 69, the frame regulation portion 81 restricts the heat of the flow rate processor 54 from transferring to the flow rate detection unit 22 via the SA substrate 53. Therefore, it is less likely that the activation characteristics of the air flow meter 20 will be deteriorated, and the responsiveness of the flow rate detection unit 22 will be deteriorated. Further, in addition to the frame regulation portion 81, the molded part 55 has a direct regulation portion 82 that is located between the flow rate processor 54 and the flow rate detection unit 22 in the height direction Y. The direct regulation portion 82 is a portion that regulates direct transfer of heat from the flow rate processor 54 to the flow rate detection unit 22 without passing through the SA substrate 53.

Figure 9:
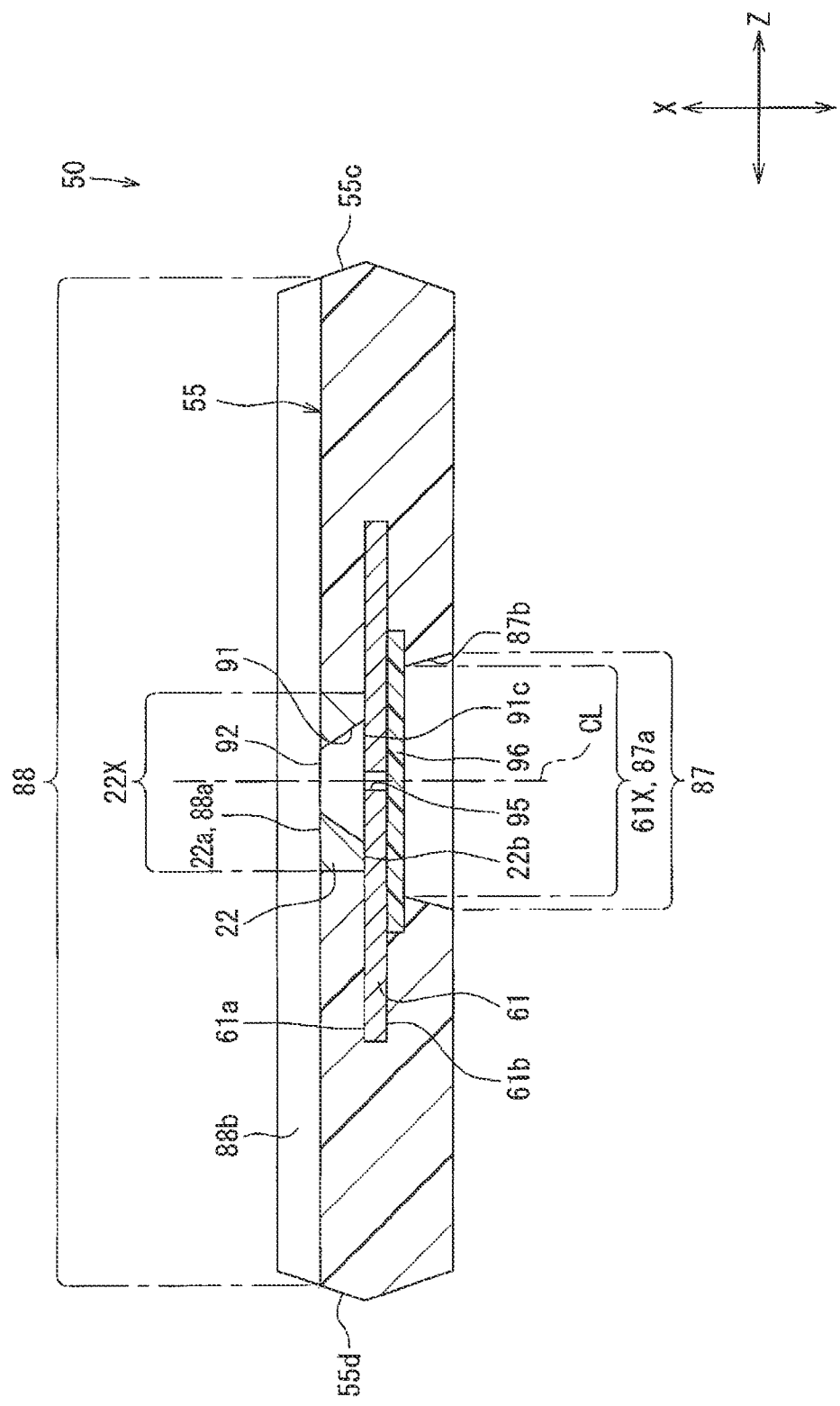
FIG. 9 is a cross-sectional view taken along line IX-IX in FIG. 7.
Figure 10:
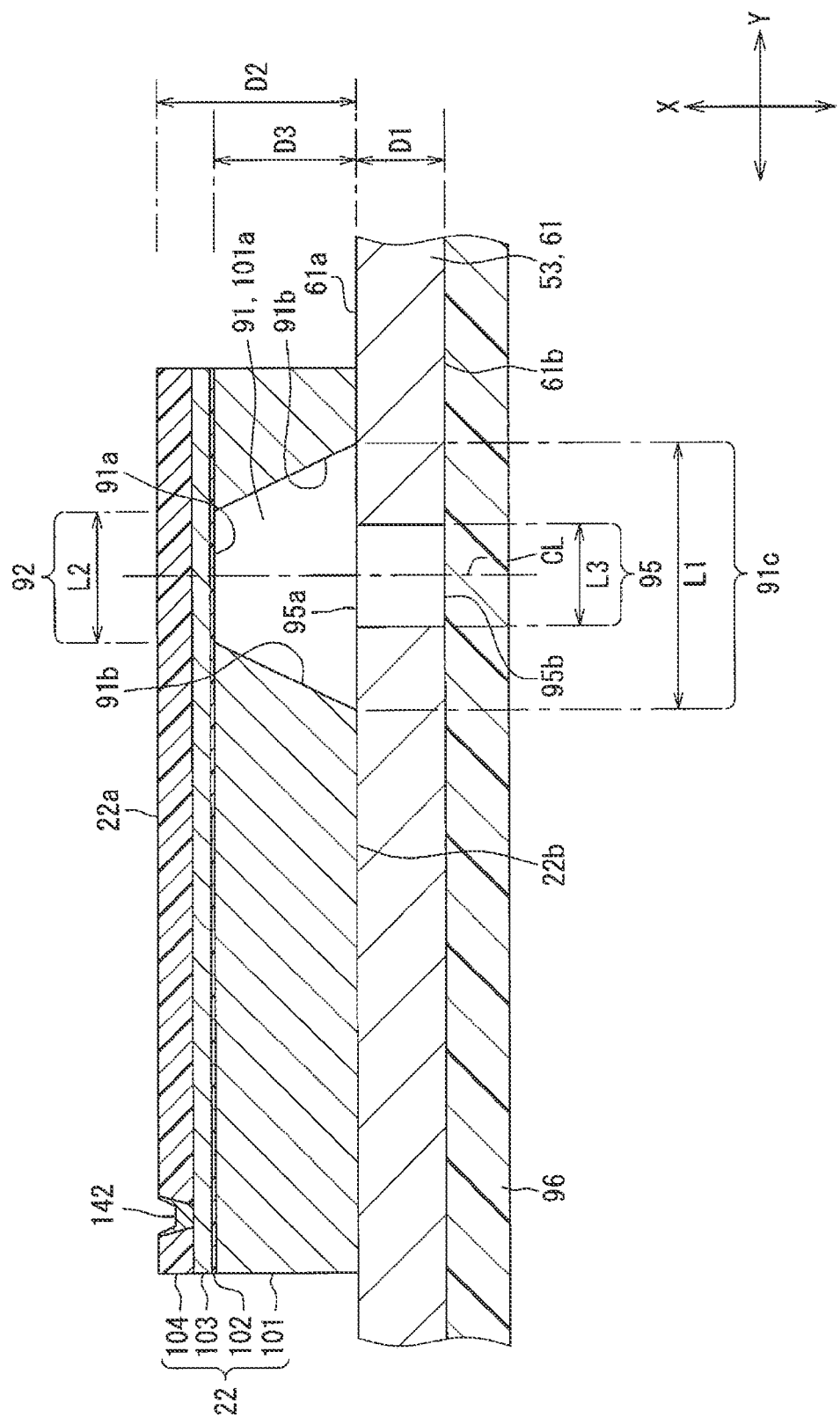
FIG. 10 is an enlarged view of the periphery of a flow rate detection unit in FIG. 8.

As shown in FIGS. 8 to 10, the flow rate detection unit 22 has a detection recess 91 formed by recessing the back surface 22b thereof and a membrane part 92 forming the bottom surface 91a of the detection recess 91. The detection recess 91 has a bottom surface 91a facing the detection frame 61 and an inner wall surface 91b extending from the bottom surface 91a toward the detection frame 61. The detection recess 91 has a recess opening 91c, which is an opening that allows an internal space of the detection recess 91 to open toward the side opposite to the bottom surface 91a, and the recess opening 91c is provided on the back surface 22b of the flow rate detection unit 22. The detection recess 91 is covered with the detection frame 61, and the bottom surface 91a faces the front surface 61a of the detection frame 61. The detection recess 91 corresponds to a recessed part. Further, the internal space of the detection recess 91 is hollow, and the detection recess 91 may also be referred to as a cavity or a gap.

The center line CL of the detection recess 91 extends in the width direction X and is orthogonal to the front surface 22a and the back surface 22b of the flow rate detection unit 22. The detection recess 91 is tapered off from the recess opening 91c toward the bottom surface 91a, and the inner wall surface 91b extends straight from the recess opening 91c toward the bottom surface 91a, so that the detection recess 91 has a tapered shape as a whole. The internal space of the detection recess 91 gradually becomes smaller toward the bottom surface 91a in the width direction X, and the detection recess 91 has a tapered shape as a whole. In this case, the cross-sectional area of the detection recess 91 in the direction orthogonal to the center line CL gradually increases from the bottom surface 91a toward the recess opening 91c. The inner wall surface 91b is not parallel to the center line CL, but is inclined with respect to the center line CL so as to face the recess opening 91c. The detection recess 91 has two pairs of inner wall surfaces 91b facing each other, so that the bottom surface 91a and the recess opening 91c have a rectangular shape. In the detection recess 91, the open area of the recess opening 91c is larger than the area of the bottom surface 91a.

An end of the inner wall surface 91b adjacent to the back surface 22b forms the peripheral edge portion of the recess opening 91c, and an end of the inner wall surface 91b adjacent to the front surface 22a forms the peripheral edge portion of the bottom surface 91a. As shown in FIG. 10, in the present embodiment, a separation distance between a pair of sides of the peripheral edge portion of the recess opening 91c facing each other is referred to as an opening dimension L1 of the recess opening 91c, and a separation distance between a pair of sides of the peripheral edge portion of the bottom surface 91a facing each other is referred to as a bottom surface dimension L2. The recess opening 91c and the bottom surface 91a each have a square shape. Thus, the opening dimension L1 and the bottom surface dimension L2 are each equal between the pair of sides arranged in the height direction Y and the pair of sides arranged in the depth direction Z. The opening dimension L1 of the recess opening 91c is larger than the bottom surface dimension L2 of the bottom surface 91a. In FIG. 10, the molded part 55 is not shown, and the membrane part 92 is shown thicker than its actual thickness.

The membrane part 92 is provided on the front side of the detection recess 91 in the width direction X, and is a film-like portion thinned by the detection recess 91 in the flow rate detection unit 22. The surface of the membrane part 92 is formed by the front surface 22a of the flow rate detection unit 22, and the back surface of the membrane part 92 is formed by the bottom surface 91a of the detection recess 91. In this case, the membrane part 92 is not arranged between the front surface 22a and the back surface 22b, but is arranged at the front surface 22a, in the flow rate detection unit 22. The membrane part 92 has a plurality of detection elements, and is a sensor unit that detects the flow rate of air in the flow rate detection unit 22.

In a plan view, the shape and size of the membrane part 92 are the same as the shape and size of the detection recess 91. Specifically, when a separation distance between the pair of sides facing each other in the peripheral edge portion of the membrane part 92 is referred to as a membrane dimension, the membrane dimension is the same as the bottom surface dimension L2. Further, the membrane part 92 has a square shape, similarly to the detection recess 91, and the membrane dimension is the same for each of the pair of sides arranged in the height direction Y and the pair of sides arranged in the depth direction Z.

The detection frame 61 is formed with a detection frame hole 95 communicating with the internal space of the detection recess 91 at a portion of the detection frame 61 that covers the recess opening 91c of the detection recess 91. The detection frame hole 95 is a through hole that passes through the detection frame 61 in the width direction X, and is a round hole having a circular cross section. The center line of the detection frame hole 95 coincides with the center line CL of the detection recess 91. The detection frame hole 95 has a front opening 95a which is an end portion on the front surface 61a. The recess opening 91c and the front opening 95a are included in the boundary between the detection recess 91 and the detection frame hole 95. The detection frame 61 corresponds to a portion covering the detection recess 91, the detection frame hole 95 corresponds to a communication hole, and the front opening 95a corresponds to a hole opening.

The peripheral edge portion of the front opening 95a is located at a position spaced apart from the peripheral edge portion of the recess opening 91c, toward an inner peripheral side, that is, toward the center line CL. In this case, the front opening 95a is smaller than the recess opening 91c. Specifically, the inner diameter L3 of the front opening 95a is smaller than the opening dimension L1 of the recess opening 91c. The inner diameter L3 of the front opening 95a is defined by a separation distance between portions of a peripheral edge of the front opening 95a facing each other at a shortest distance on opposite sides of the center line CL. The center of the front opening 95a is a portion through which the center line CL passes. Further, the width of the detection frame hole 95 is constant in the width direction X, and the inner diameter of the detection frame hole 95 is the same as the inner diameter L3 of the front opening 95a.

Further, the peripheral edge portion of the front opening 95a is located at a position spaced apart, toward the inner peripheral side, from the peripheral edge portion of the bottom surface 91a of the detection recess 91. That is, the peripheral edge portion of the front opening 95a is located at a position spaced apart, toward the inner peripheral side, from the membrane part 92. In this case, the front opening 95a is smaller than the bottom surface 91a. Specifically, the inner diameter L3 of the front opening 95a is smaller than the bottom surface dimension L2 of the bottom surface 91a.

In the case where the detection frame hole 95 is formed in the detection frame 61, it is assumed that burrs, which are unnecessary protrusions, may remain on the peripheral edge portion of the detection frame hole 95. For example, when the detection frame hole 95 is formed by punching or pressing, if the detection frame 61 is punched from the back surface 61b toward the front surface 61a, burrs extending from the front surface 61a may be generated on the peripheral edge portion of the front opening 95a. If these burrs come into contact with the back surface 22b of the flow rate detection unit 22, there is a concern that the flow rate detection unit 22 may be damaged or broken, and the detection accuracy of the flow rate detection unit 22 may decrease. On the other hand, in the present embodiment, since the peripheral edge portion of the front opening 95a is located at a position more to inside than the peripheral edge portion of the recess opening 91c, even if burrs remain on the peripheral edge portion of the front opening 95a, the burrs are present more to inside than the peripheral edge portion of the recess opening 91c. That is, the burrs exist in the internal space of the detection recess 91. Therefore, it is possible to restrict the burrs from coming into contact with the back surface 22b of the flow rate detection unit 22 and damaging or breaking the flow rate detection unit 22.

The sensor SA 50 has a filter unit 96 that covers the detection frame hole 95 on the back surface 61b. The filter unit 96 is a film-like ventilation filter such as a porous film that allows air to pass through, and is stacked on the back surface 61b of the detection frame 61. The filter unit 96 is a member that removes foreign particles such as dirt, dust, and the like from the air flowing into the detection frame hole 95 and the detection recess 91. The filter unit 96 is smaller than the back surface 61b of the detection frame 61, and is arranged at a position so that the filter unit 96 does not protrude outside from the back surface 61b. The detection frame hole 95 has a back opening 95b which is an end adjacent to the back surface 61b, and the back opening 95b is included in the boundary portion between the detection frame hole 95 and the filter unit 96.

As shown in FIGS. 8 and 9, the molded part 55 has a front cover portion 84 provided adjacent to the front surface 61a of the detection frame 61 and a back cover portion 85 provided adjacent to the back surface 61b of the detection frame 61. The front cover portion 84 covers the front surface 61a of the detection frame 61 together with the flow rate detection unit 22 from the front side in a state where the membrane part 92 of the flow rate detection unit 22 is exposed on the front side of the sensor SA 50. In this case, the front cover portion 84 is in a state of being overlapped with each of the front surface 61a of the detection frame 61 and the front surface 22a of the flow rate detection unit 22. The front cover portion 84 corresponds to a detection body portion.

The front surface 22a of the flow rate detection unit 22 has a front extension region 22X extending from the membrane part 92 toward the outer peripheral side. The front extension region 22X is an exposed region exposed on the front side of the sensor SA 50 around the membrane part 92 on the front surface 22a of the flow rate detection unit 22. In this case, the front surface 22a of the flow rate detection unit 22 is not entirely exposed on the front side of the sensor SA 50, but only the membrane part 92 and the front extension region 22X of the front surface 22a are exposed on the front side of the sensor SA50. The front extension region 22X has an annular shape entirely along the peripheral edge portion of the membrane part 92 between the membrane part 92 and the front cover portion 84.

Figure 4:
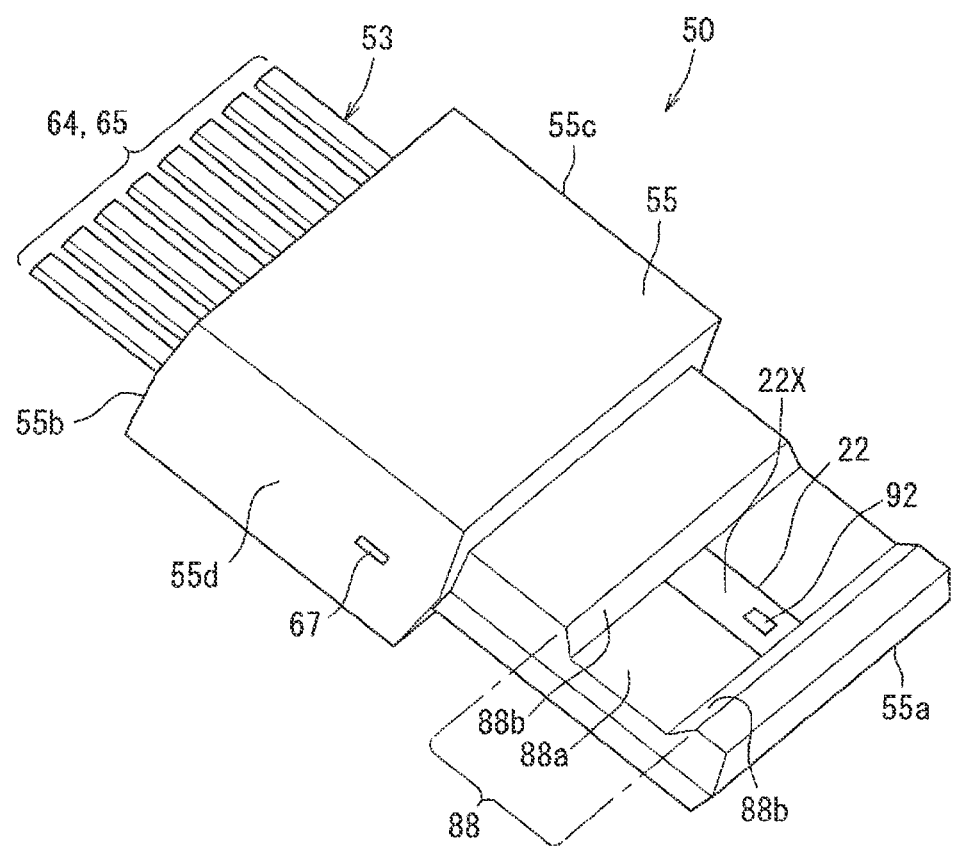
FIG. 4 is a perspective view of a sensor SA when viewed from a front side.

In the molded part 55, the front cover portion 84 is partly thinned, so that the membrane part 92 and the front extension region 22X are not covered by the front cover portion 84. Specifically, as shown in FIGS. 4 and 8, the molded part 55 is provided with a groove-shaped front mold groove 88 extending in the depth direction Z. The front mold groove 88 is a groove formed by depressing the surface of the molded part 55, and extends over between the mold upstream surface 55c and the mold downstream surface 55d. The front mold groove 88 has the depth such that the front surface 22a of the flow rate detection unit 22 is exposed but the front surface 61a of the detection frame 61 is not exposed, and the front surface 22a of the flow rate detection unit 22 is included in the bottom surface 88a of the front mold groove 88. That is, the membrane part 92 and the front extension region 22X are exposed at the bottom surface 88a of the front mold groove 88.

The internal space of the front mold groove 88 in the width direction X gradually reduces toward the bottom surface 88a. The inner peripheral surface of the front mold groove 88 has a pair of inner wall surfaces 88b facing each other on opposite sides of the bottom surface 88a. These inner wall surfaces 88b are inclined with respect to the width direction X so as to face the side opposite to the flow rate detection unit 22, and are tapered surfaces extending straight from the bottom surface 88a. The front extension region 22X is in a state of extending between the pair of inner wall surfaces 88b.

In the front mold groove 88, the flow rate detection unit 22 is located at an intermediate position in the depth direction Z. That is, the flow rate detection unit 22 is located between the mold upstream surface 55c and the mold downstream surface 55d. Further, the sensor SA 50 is installed with respect to the measurement flow path 32 so that the front mold groove 88 extends in the air flow direction in the measurement flow path 32. Therefore, the air flowing through the measurement flow path 32 is rectified by the inner surfaces of the front mold groove 88 by the time the air reaches the flow rate detection unit 22. Therefore, it is possible to suppress the detection accuracy of the flow rate detection unit 22 from being degraded due to the turbulence of the air flow.

The back cover portion 85 covers the back surface 61b of the detection frame 61 together with the filter unit 96 from the back side in a state where a part of the filter unit 96 is exposed on the back side of the sensor SA 50. In this case, the back cover portion 85 is in a state of being overlapped on the back surface 61b of the detection frame 61 and the back surface of the filter unit 96, respectively. The portion of the filter unit 96 exposed on the back side of the sensor SA 50 includes a portion overlapping the back opening 95b of the detection frame hole 95, and the detection frame hole 95 is open on the back side of the sensor SA 50 via the filter unit 96. The back cover portion 85 corresponds to a support body portion.

In the present embodiment, although the detection frame hole 95 is covered by the filter unit 96, the detection frame hole 95 is not covered by the back cover portion 85. This state of the detection frame hole 95 is referred to as "a state in which the detection frame hole 95 is exposed". This also applies to a back extension region 61X, which will be described later. Although the back extension region 61X is covered by the filter unit 96, the back extension region 61X is not covered by the back cover portion 85. This state of the back extension region 61X is referred to as "a state in which the back extension region 61X is exposed".

The back surface 61b of the detection frame 61 has a back extension region 61X extending from the back opening 95b toward the outer peripheral side. The back extension region 61X is an exposed region of the back surface 61b of the detection frame 61 that is exposed on the back side of the sensor SA 50 around the back opening 95b of the detection frame hole 95. In this case, the back surface 61b of the detection frame 61 is not entirely exposed on the back side of the sensor SA 50, but only the detection frame hole 95 and the back extension area 61X of the back surface 61b are exposed on the back surface of the sensor SA 50. The back extension region 61X has an annular shape entirely along the peripheral edge portion of the back opening 95b between the back opening 95b and the back cover portion 85 of the detection frame hole 95.

As shown in FIGS. 5 and 8, in the molded part 55, since the back cover portion 85 is formed with a back mold hole 87, the detection frame hole 95 and the back extension region 61X are not covered by the back cover portion 85. The back mold hole 87 passes through the back cover portion 85 in the width direction X, and is a round hole larger than the detection frame hole 95. The back mold hole 87 has a front end 87a as an end adjacent to the detection frame 61, and the peripheral edge portion of the front end 87a is spaced apart, toward an outer peripheral side, from the back opening 95b of the detection frame hole 95. As a result, a back extension region 61X is formed between the peripheral edge portion of the front end 87a and the back opening 95b. In this case, the inner diameter L4 of the front end 87a is larger than the inner diameter of the back opening 95b. In the detection frame hole 95, the inner diameter of the back opening 95b is the same as the inner diameter L3 of the front opening 95a. The back mold hole 87 corresponds to an exposing hole that exposes the detection frame hole 95 and the back extension region 61X, and to a heat radiation hole that discharges the heat of the detection frame 61 to the outside.

Further, the peripheral edge portion of the front end 87a is spaced apart, toward the outer peripheral side, from both the bottom surface 91a of the detection recess 91 and the recess opening 91c. In this case, the inner diameter L4 of the front end 87a is larger than the bottom surface dimension L2 of the bottom surface 91a (see FIG. 10) and the opening dimension L1 of the recess opening 91c (see FIG. 10).

The front extension region 22X of the flow rate detection unit 22 and the back extension region 61X of the detection frame 61 are aligned in the width direction X. In this case, at least a part of the front extension region 22X and a part of the back extension region 61X overlap each other in the width direction X, and the overlapping parts make one round about the center line CL so as to have a ring shape.

The back mold hole 87 is smaller than each of the detection frame 61 and the filter unit 96. The molded part 55 covers the peripheral portions of the detection frame 61 and the filter unit 96. In this case, the molded part 55 restricts the filter unit 96 from peeling off from the detection frame 61.

The size of the back mold hole 87 gradually reduces in the width direction X toward the detection frame 61. That is, the size of the back mold hole 87 gradually increases from the front end 87a toward the back end. The inner peripheral surface 87b of the back mold hole 87 is inclined with respect to the width direction X so as to face the side opposite to the detection frame 61, and is a tapered surface extending straight from the front end 87a.

As shown in FIG. 10, the flow rate detection unit 22 includes a detection base material 101 which is a plate-shaped base material, an insulation film 102 having an insulating property, a resistor 103 having a plurality of resistance elements, and a protection film 104 that protects the resistor 103. The detection base material 101 is formed of a semiconductor material such as silicon, and has a plate shape. The insulation film 102 is overlaid on one plate surface of the detection base material 101, the resistor 103 is overlaid on the insulation film 102, and the protection film 104 is overlaid on the resistor 103. The insulation film 102, the resistor 103 and the protection film 104 provide the membrane part 92.

The flow rate detection unit 22 has a base material hole 101a that passes through the detection base material 101 in the width direction X. In the flow rate detection unit 22, the detection recess 91 is formed by covering the base material hole 101a with the insulation film 102, the resistor 103, and the protection film 104. Further, the portions of the insulation film 102, the resistor 103, and the protection film 104 that cover the base material hole 101a provide the membrane part 92. In the flow rate detection unit 22, the base material hole 101a is formed by processing a part of the detection base material 101 by wet etching. That is, the detection recess 91 and the membrane part 92 are formed by wet etching. In this case, on the inner wall surface 91b of the detection recess 91, the crystal plane orientation of the silicon is the <110>plane, and the inner wall surface 91b has a predetermined inclination angle (for example, 54.7 degrees) relative to the center line CL. The base material hole 101a may be formed by performing a dry etching process on the detection base material 101.

The detection frame hole 95 has a size that does not excessively increase the difficulty of the work load for forming the detection frame hole 95. Specifically, the opening dimension L1 of the front opening 95a is larger than the thickness dimension D1 of the detection frame 61 in the width direction X. On the other hand, the opening dimension L1 is smaller than the thickness dimension D2 of the flow rate detection unit 22 in the width direction X. Further, the opening dimension L1 is smaller than the thickness dimension D3 of the detection base material 101 in the width direction X.

Next, the electrical configuration of the sensor SA 50 will be described with reference to FIGS. 11 to 13 and the like. The sensor SA 50 has a flow rate detection circuit 110 that detects the flow rate of air, and the flow rate detection circuit 110 provides a thermal-type flow rate detection unit 22.

Figure 11:
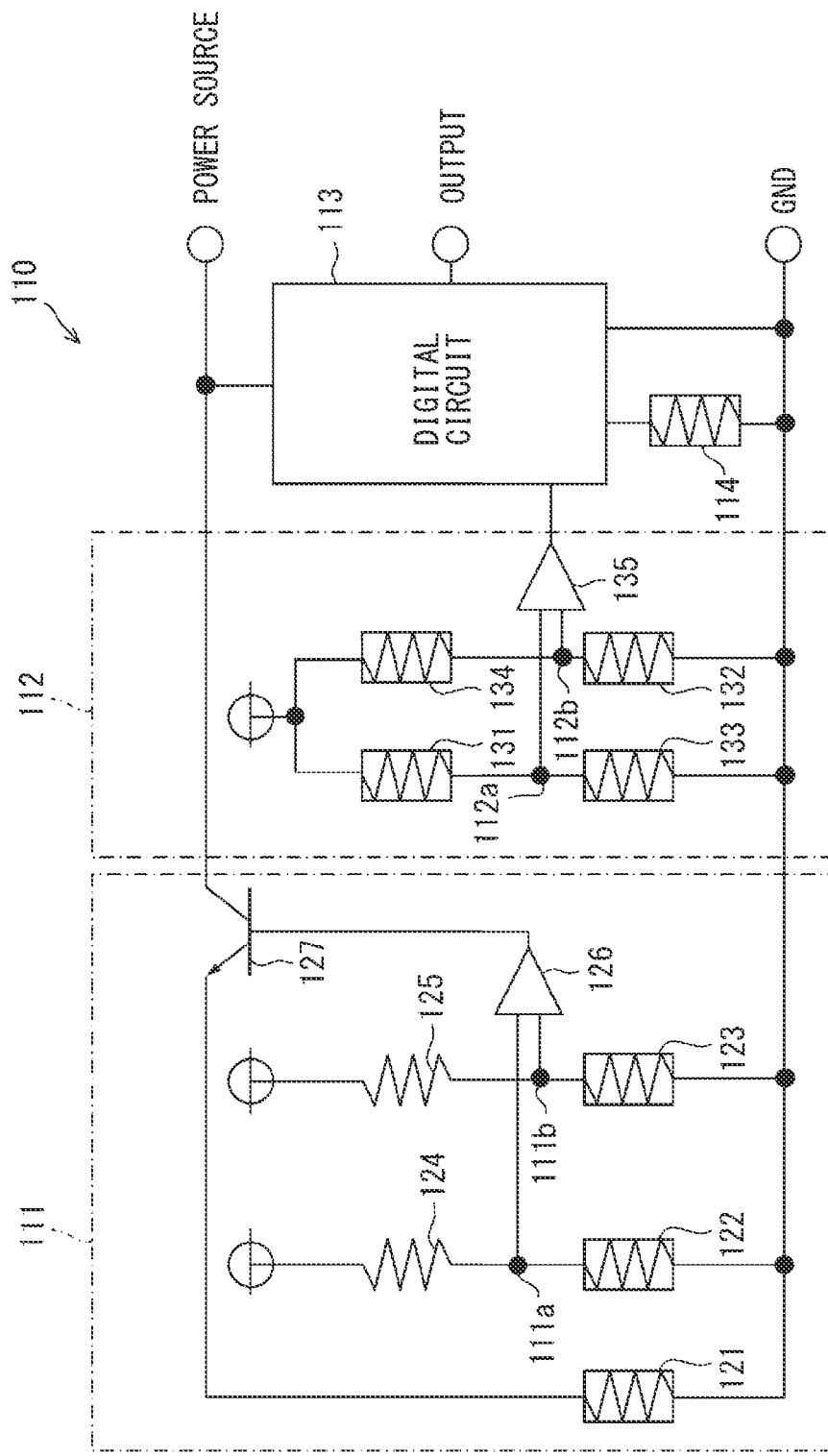
FIG. 11 is a circuit diagram showing a configuration of a flow rate detection circuit.

As shown in FIG. 11, the flow rate detection circuit 110 includes a heater control bridge 111 that controls the heater temperature, a flow rate detection bridge 112 that detects the flow rate according to the temperature of the air, and a digital circuit 113 that performs various processes. The heater control bridge 111, the flow rate detection bridge 112, and the digital circuit 113 each include a plurality of circuit elements such as resistance elements and switching elements. These circuit elements correspond to detection elements for detecting the physical quantity of the fluid.

The heater control bridge 111 is connected to a power supply terminal and a ground terminal in the flow rate detection circuit 110. The heater control bridge 111 includes a heater resistor 121 that generates heat when energized, a heater temperature resistor 122 that detects the temperature of the heater resistor 121, and a first air temperature resistor 123 that detects the temperature of the air flowing through the measurement flow path 32. Further, the heater control bridge 111 has a first control resistor 124 connected in series with the heater temperature resistor 122 and a second control resistor 125 connected in series with the first air temperature resistor 123.

The heater control bridge 111 includes an operational amplifier 126 as a comparison element for comparing potentials and a transistor 127 as a switching element for opening and closing an electrical conduction path. The operational amplifier 126 is connected to a first connection point 111a between the heater temperature resistor 122 and the first control resistor 124, and is also connected to a connection point 111b between the second air temperature resistor 123 and the second control resistor 125. The operational amplifier 126 is a comparison unit that compares the potential of the first connection point 111a with the potential of the second connection point 111b. The transistor 127 is connected to the output terminal of the operational amplifier 126, and operates according to the output of the operational amplifier 126. In the heater control bridge 111, the transistor 127 operates so that the temperature of the heater resistor 121 becomes a target temperature higher than the temperature of the air by a predetermined temperature.

In the heater control bridge 111, when the temperature of the heater resistor 121 is lower than the target temperature, the resistance value of the heater temperature resistor 122 becomes smaller and the potential difference between the connection points 111a and 111b becomes larger, so that the operational amplifier 126 controls the transistor 127 to turn on. In this case, the temperature of the heater resistor 121 rises as the heater resistor 121 is electrically conducted. When the temperature of the heater resistor 121 rises to the target temperature, the resistance value of the heater temperature resistor 122 increases and the potential difference between the connection points 111a and 111b decreases, so that the operational amplifier 126 controls the transistor 127 to turn off. In this case, the temperature of the heater resistor 121 is lowered by stopping the electrical conduction to the heater resistor 121. In this way, in the heater control bridge 111, the temperature of the heater resistor 121 is maintained at the target temperature.

The flow rate detection bridge 112 is connected to the signal terminal and the ground terminal in the flow rate detection circuit 110. The flow rate detection bridge 112 has upstream resistors 131 and 132 that detect the air temperature on the upstream side of the heater resistor 121 in the measurement flow path 32, and downstream resistors 133 and 134 that detect the air temperature on the downstream side of the heater resistor 121 in the measurement flow path 32. The upstream resistors 131 and 132 and the downstream resistors 133 and 134 are connected in series one by one. In this case, the first upstream resistor 131 is connected to the ground terminal via the first downstream resistor 133, and the second downstream resistor 134 is connected to the ground terminal via the second upstream resistor 132.

The flow rate detection bridge 112 has an operational amplifier 135 as a comparison element for comparing potentials. The operational amplifier 135 is connected to a first connection point 112a between the first upstream resistor 131 and the first downstream resistor 133, and is also connected to a connection point 112b between the second upstream resistor 132 and the second downstream resistor 134. The operational amplifier 135 is a comparison unit that compares the potential of the first connection point 112a with the potential of the second connection point 112b. The output terminal of the operational amplifier 135 is connected to the digital circuit 113, and the comparison result of the potentials of the connection points 112a and 112b is provided to the digital circuit 113.

When there is no air flow caused in the measurement flow path 32, in the flow rate detection bridge 112, the heat of the heater resistor 121 is transferred similarly to both the upstream and downstream, and thus the resistance values of the upstream resistors 131 and 132 and the resistance values of the downstream resistors 133, 134 have almost the same resistance value. In this case, since the potential difference between the connection points 112a and 112b is small, the comparison result of the operational amplifier 135 is provided to the digital circuit 113.

When a forward flow of air from the measurement inlet 35 to the measurement outlet 36 occurs in the measurement flow path 32, the heat of the heater resistor 121 in the flow rate detection bridge 112 is transferred more to the downstream resistors 133 and 134 than to the upstream resistors 131 and 132 because the forward flow serves as a medium. In this case, the potential difference between the connection points 112a and 112b becomes a value according to both the air direction of the forward flow and the air flow rate, and this value is provided to the digital circuit 113 as the comparison result of the operational amplifier 135.

On the other hand, when a backflow, which is opposite to the forward flow, occurs in the measurement flow path 32, the heat of the heater resistor 121 is transferred more to the upstream resistors 131 and 132 than the downstream resistors 133 and 134 because the backflow serves as a medium. In this case, the potential difference between the connection points 112a and 112b becomes a value according to both the air direction of backflow and the air flow rate, and this value is provided to the digital circuit 113 as the comparison result of the operational amplifier 135.

The flow rate detection circuit 110 has a second air temperature resistor 114 that detects the temperature of the air flowing through the measurement flow path 32, and the second air temperature resistor 114 is connected to the digital circuit 113. The digital circuit 113 calculates the flow rate of air flowing through the measurement flow path 32 and the intake passage 12 by using the comparison result of the operational amplifier 135 and the potential of the second air temperature resistor 114, and outputs the information including the calculation result to the output terminal.

Detection elements such as a heater resistor 121 included in the flow rate detection circuit 110 are included in the flow rate detection unit 22 and the flow rate processor 54. For example, the flow rate detection unit 22 includes resistors 114, 121 to 125, 131 to 134 and connection points 111a, 111b, 112a, 112b. In the flow rate detection unit 22, the resistor 103 includes the plurality of resistors 114, 121 to 125, 131 to 134 as a plurality of resistance elements. The flow rate processor 54 includes the digital circuit 113, the operational amplifiers 126 and 135, and the transistor 127.

As described above, since the digital circuit 113 has a large number of circuit elements, it is considered that heat is likely to be generated when the digital circuit 113 is driven to perform various processes. Further, it is considered that the operational amplifiers 126 and 135 and the transistor 127 are also likely to generate heat when operated. Therefore, it is assumed that the flow rate processor 54 having the digital circuit 113, the operational amplifiers 126, 135, and the transistor 127 generates heat when processing the detection result received from the flow rate detection unit 22.

Figure 12:
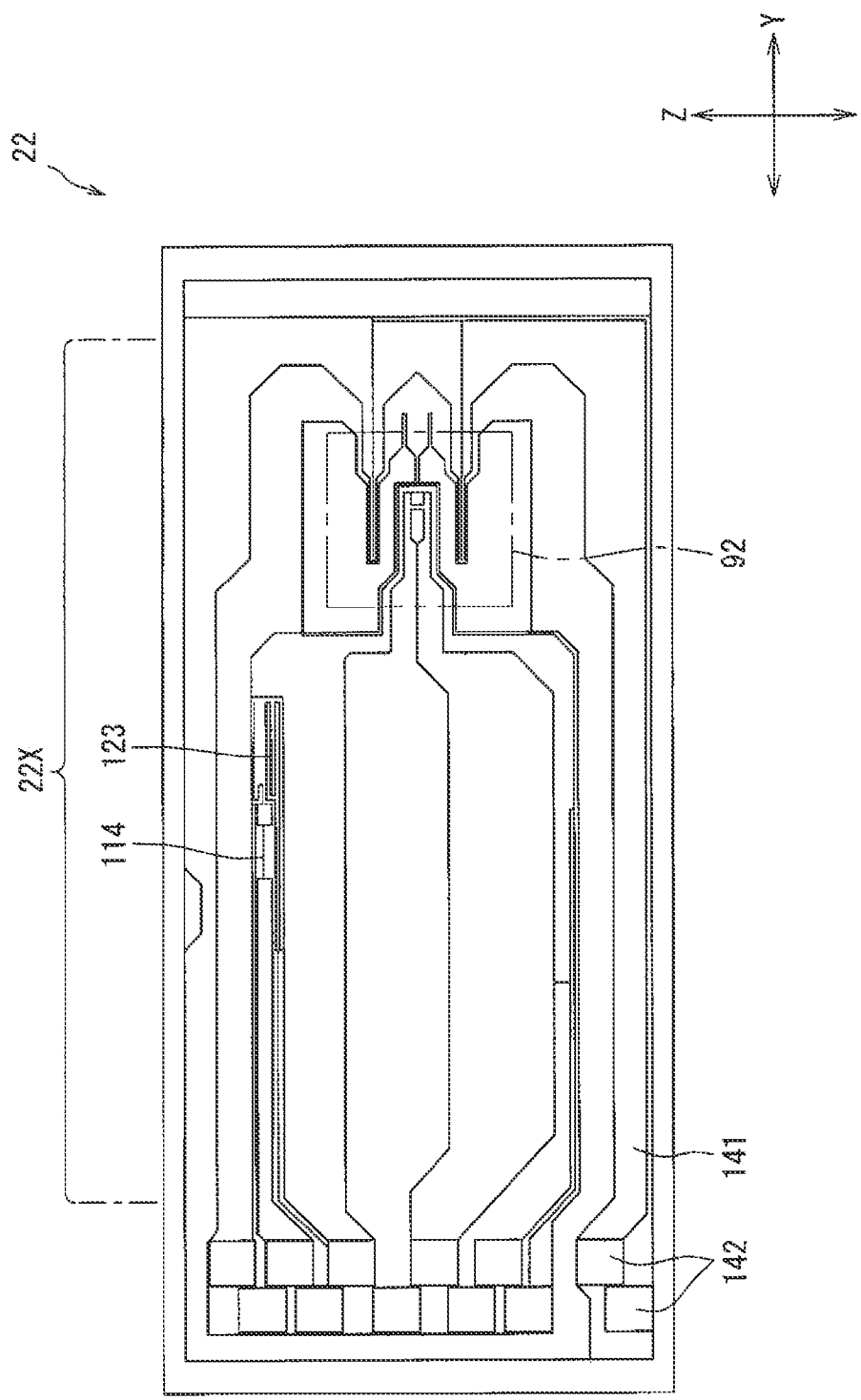
FIG. 12 is a plan view for showing the positional relationship between an air temperature resistance and a membrane in the flow rate detection unit.
Figure 13:
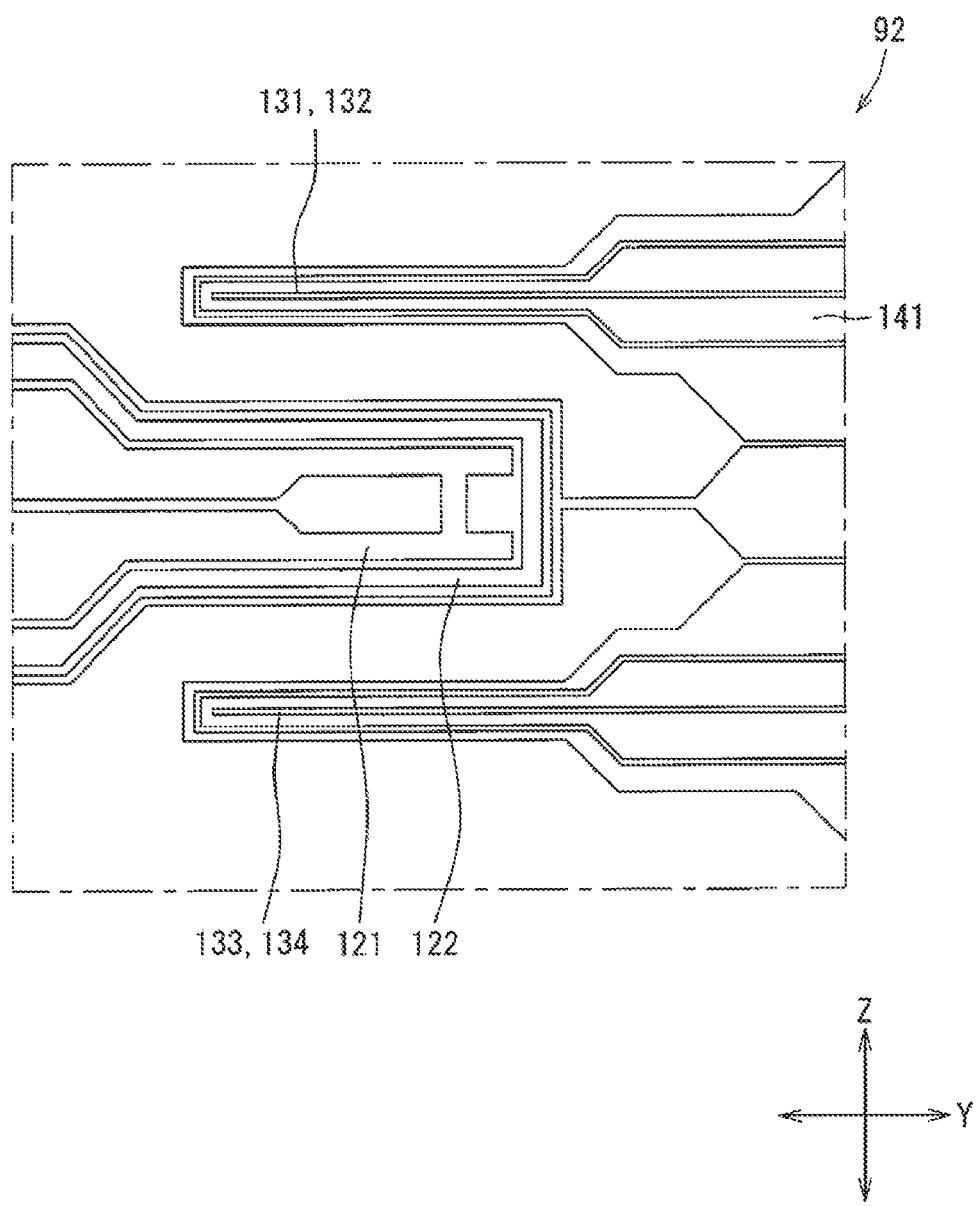
FIG. 13 is an enlarged view of the periphery of the membrane in FIG. 12.

As shown in FIGS. 12 and 13, the flow rate detection unit 22 includes the plurality of resistance elements such as the heater resistor 121, wiring patterns 141 connected to these resistance elements, and a plurality of electrodes 142 connected to the wiring patterns 141. The plurality of resistance elements are provided in at least either one of the membrane part 92 or the front extension region 22X in the flow rate detection unit 22.

As shown in FIG. 13, the membrane part 92 is provided with the heater resistor 121, the heater temperature resistor 122, the upstream resistors 131 and 132, and the downstream resistors 133 and 134. The heater resistor 121 is arranged at the center or a position close to the center of the membrane part 92, and the heater temperature resistor 122 is arranged at a position close to the heater resistor 121. The heater temperature resistor 122 is an indirectly heated resistor that detects the temperature of the heater resistor 121 and disposed beside the heater resistor 121. The upstream resistors 131 and 132 are arranged adjacent to the mold upstream surface 55c than the heater resistor 121 in the depth direction Z, and the downstream resistors 133 and 134 are arranged adjacent to the mold downstream surface 55d than the heater resistor 121. In this case, the heater resistor 121 is arranged between the upstream resistors 131 and 132 and the downstream resistors 133 and 134 in the depth direction Z.

Since the membrane part 92 is thinned as described above, heat is less likely to transfer through the membrane part 92. Therefore, when heat is generated by the heater resistor 121, it is less likely that the heat will transfer to the upstream resistors 131 and 132 and the downstream resistors 133 and 134 via the constituent parts of the flow rate detection unit 22, such as the detection base material 101. In this case, the resistance values of the upstream resistors 131 and 132 and the downstream resistors 133 and 134 do not change due to the heat transferred through the constituent parts of the flow rate detection unit 22, but change due to the heat transmitted through the air. Therefore, it is possible to suppress the degradation of the detection accuracy of the flow rate detection unit 22 due to the heat of the heater resistor 121.

As described above, since the internal space of the detection recess 91 is open to the outside of the sensor SA 50 through the detection frame hole 95 and the back mold hole 87, it is less likely that the membrane part 92 will be deformed due to the pressure difference between the inside and the outside of the detection recess 91. If the membrane part 92 is deformed, the positional relationship between the heater resistor 121 and the upstream resistors 131, 132 or the positional relationship between the heater resistor 121 and the downstream resistors 133, 134 changes, and the relationship between the air flow rate and the resistance values of the resistors 131 to 134 changes. As a result, the detection accuracy of the flow rate detection unit 22 may degrade. In the present embodiment, on the other hand, since the membrane part 92 is unlikely to be deformed, the positional relationship between the heater resistor 121 and the resistors 131 to 134 and the relationship between the air flow rate and the resistance values of the resistors 131 to 134 do not easily change. As a result, the detection accuracy of the flow rate detection unit 22 can be improved.

As shown in FIG. 12, the air temperature resistors 114 and 123 are arranged in the front extension region 22X. The air temperature resistors 114 and 123 are sufficiently spaced apart from the heater resistor 121 as being arranged in the front extension region 22X. Therefore, the air temperature resistors 114 and 123 can accurately detect the temperature of the air flowing through the measurement flow path 32 regardless of the heat generated by the heater resistor 121.

In the present embodiment, the air temperature resistors 114 and 123 are arranged between the membrane part 92 and the flow rate processor 54 in the height direction Y, and the heat generated by the flow rate processor 54 is more easily transferred to the temperature resistors 114 and 123 than to the membrane part 92. If the heat generated by the flow rate processor 54 is transmitted to the flow rate detection unit 22, there is a concern that the temperature of the air temperature resistors 114 and 123 may rise in the front extension region 22X regardless of the flow rate and temperature of the air. In this case, the accuracy for detecting the air flow rate by the flow rate detection circuit 110 may be degraded. For example, when the temperature of the first air temperature resistor 123 rises, the potential of the second connection point 111b in the heater control bridge 111 changes, and hence the temperature of the heater resistor 121 may deviate from the target temperature. Further, when the temperature of the second air temperature resistor 114 rises, the calculation result of the air flow rate output from the digital circuit 113 may change. In the present embodiment, on the other hand, since the frame regulation portion 81 is provided, heat transfer from the flow rate processor 54 to the air temperature resistors 114 and 123 are restricted, and hence the detection accuracy of the flow rate detection circuit 110 is less likely to decrease.

Although not shown, the control resistors 124 and 125 are also arranged at positions sufficiently spaced apart from the heater resistor 121 in the flow rate detection unit 22. In this case, since the resistance values of the control resistors 124 and 125 are not easily changed with the heat generated by the heater resistor 121, it is possible to suppress the degradation of accuracy of temperature control of the heater resistor 121 by the heater control bridge 111. The control resistors 124 and 125 are arranged in the front extension region 22X, similarly to the air temperature resistors 114 and 123, for example.

Bonding wires 72 are respectively connected to the plurality of electrodes 142. These electrode 142 are arranged at positions covered by the molded part 55 in the flow rate detection unit 22, whereby the bonding wires 72 are protected by the molded part 55. In this case, each of the electrodes 142 is arranged at a position different from the membrane part 92 and the front extension region 22X in the flow rate detection unit 22.

As a method for manufacturing the air flow meter 20, a method for manufacturing the sensor SA 50 will be described with reference to FIGS. 14 to 24 and the like. The method for manufacturing the airflow meter 20 corresponds to a method for manufacturing a physical quantity measurement device.

First, a step of producing the flow rate detection unit 22 is performed. In this step, the insulation film 102, the resistor 103, and the protection film 104 are formed on the detection base material 101, and the base material hole 101a is formed in the detection base material 101 by wet etching, thereby to form the detection recess 91. Further, the electrodes 142 are formed. Thus, the flow rate detection unit 22 is produced.

Figure 14:
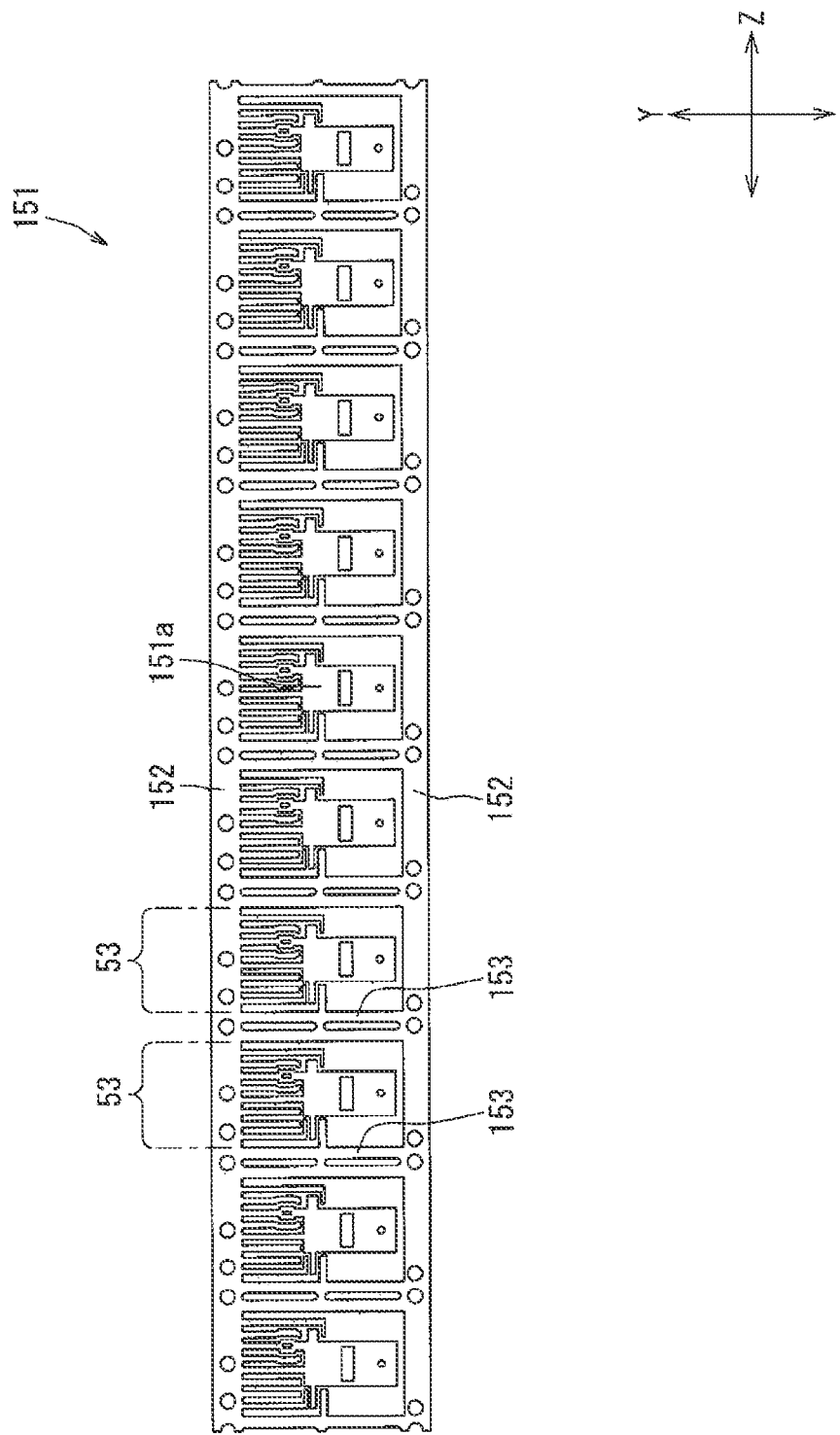
FIG. 14 is a plan view of a base material formed.
Figure 15:
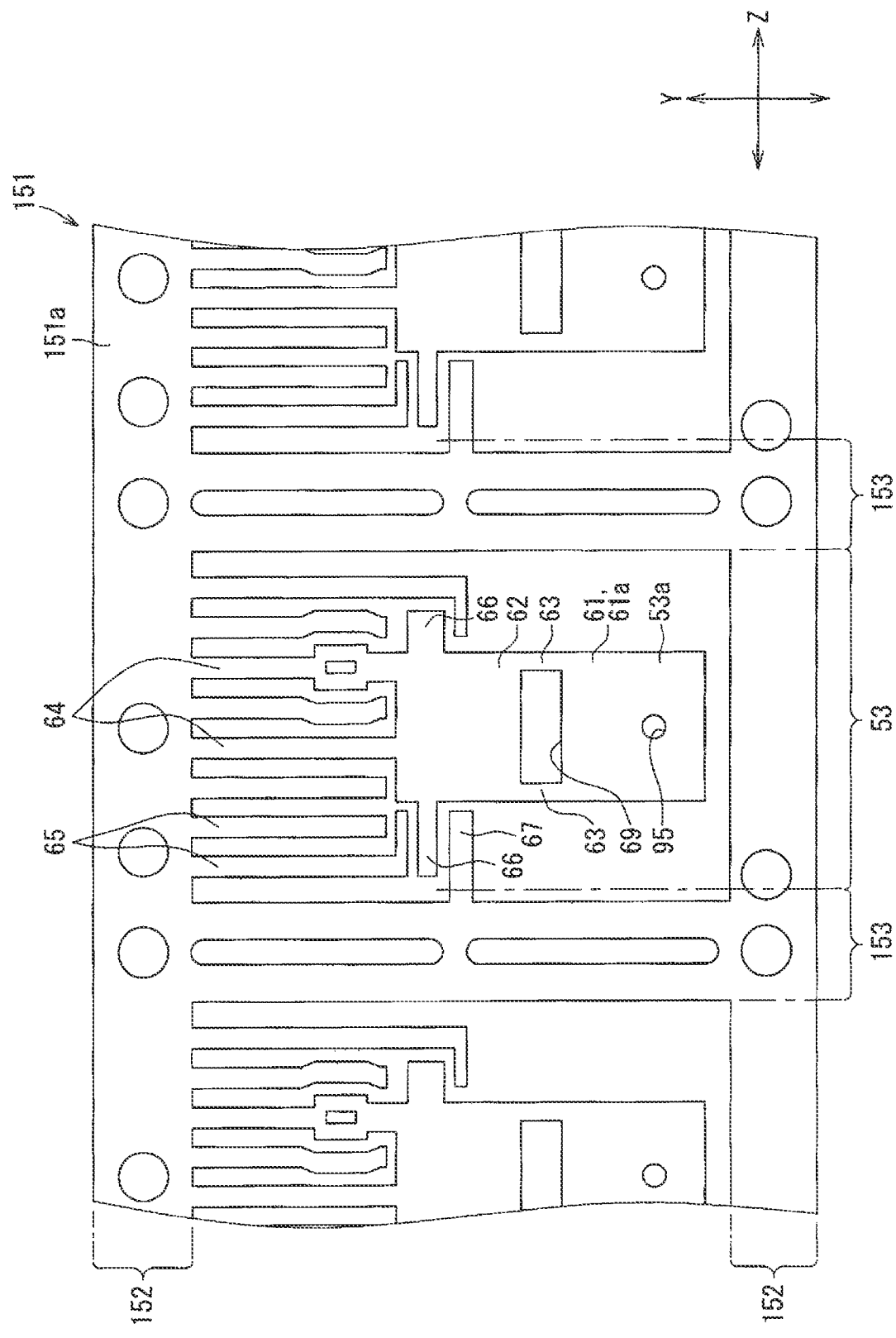
FIG. 15 is an enlarged view of the periphery of a SA substrate in FIG. 14.

Further, a step of forming the base material 151 is performed. In this step, as shown in FIGS. 14 and 15, the base material 151 having a plurality of SA substrates 53 is formed by performing punching or pressing to the conductive plate material. In the punching, the plate material is punched by applying a tool such as a punching tool from one plate surface of the plate material toward the other plate surface. In the base material 151, the plate surface from which the tool is extruded out is referred to as a punched surface 151a, and the plate surface against which the tool is pressed for punching is referred to as a punching surface 151b (see FIG. 18). In this case, in view of the direction in which the plate material is punched, it is considered that burrs caused by the punching process tend to remain on the punched surface 151a of the base material 151 and hardly remain on the punching surface 151b. In the SA substrate 53, the front surface 53a is included in the punched surface 151a, and the back surface 53b is included in the punching surface 151b. Therefore, on the front surface 53a of the SA substrate 53, the burrs are likely to remain on the peripheral edge portion of the front opening 95a of the detection frame hole 95 and the peripheral edge portions of the lead terminals 64 and 65.

The base material 151 has a pair of bridging leads 152 bridging over the plurality of SA substrates 53, and connecting leads 153 connecting between the pair of bridging leads 152. In the SA substrate 53, the lead terminals 64 and 65 are in a state of being connected to the bridging lead 152, and the circuit protection frame 67 is in a state of being connected to the connecting lead 153. In this case, the detection frame 61 and the connection frame 63 are connected to the bridging lead 152 via the ground lead terminals 64. Therefore, it is not necessary to provide the base material 151 with hanging leads for connecting the detection frame 61 and the connection frame 63 to the bridging lead 152 and the connecting lead 153.

Figure 16:
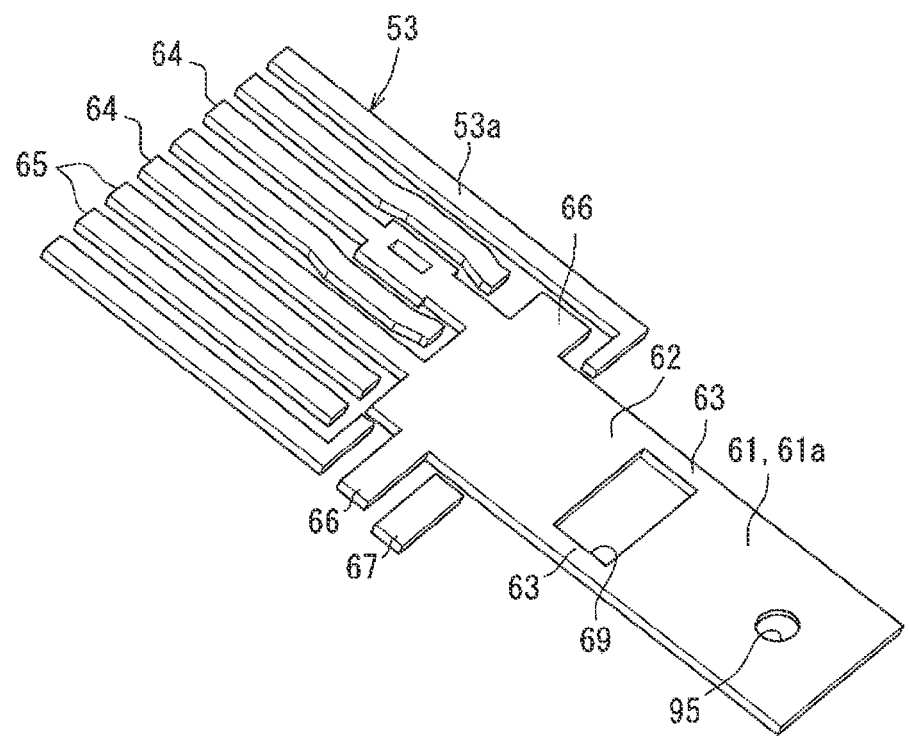
FIG. 16 is a perspective view of the SA substrate when viewed from a front side.
Figure 16:
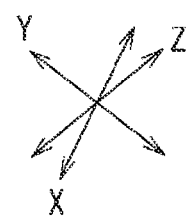

As shown in FIG. 16, when the illustrations of the bridging lead 152 and the connecting lead 153 are omitted from the base material 151, in the SA substrate 53 at the stage where the base material 151 is formed, the ground lead terminals 64 and the like are spaced apart from the detection frame 61 and the like.

Figure 17:
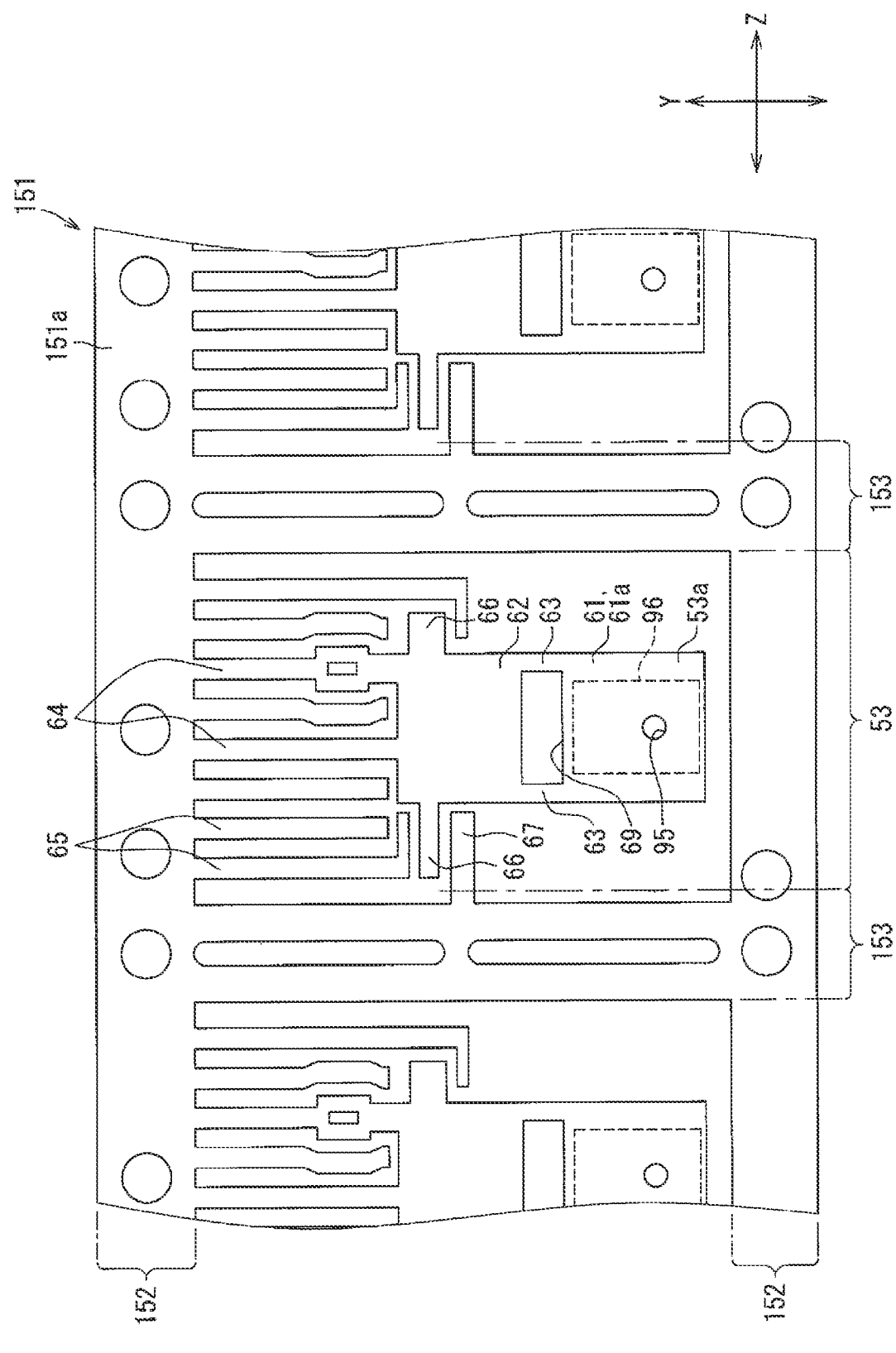
FIG. 17 is a plan view of a base material, in a state where a filter unit is attached to the SA substrate, when viewed from the front side.
Figure 18:
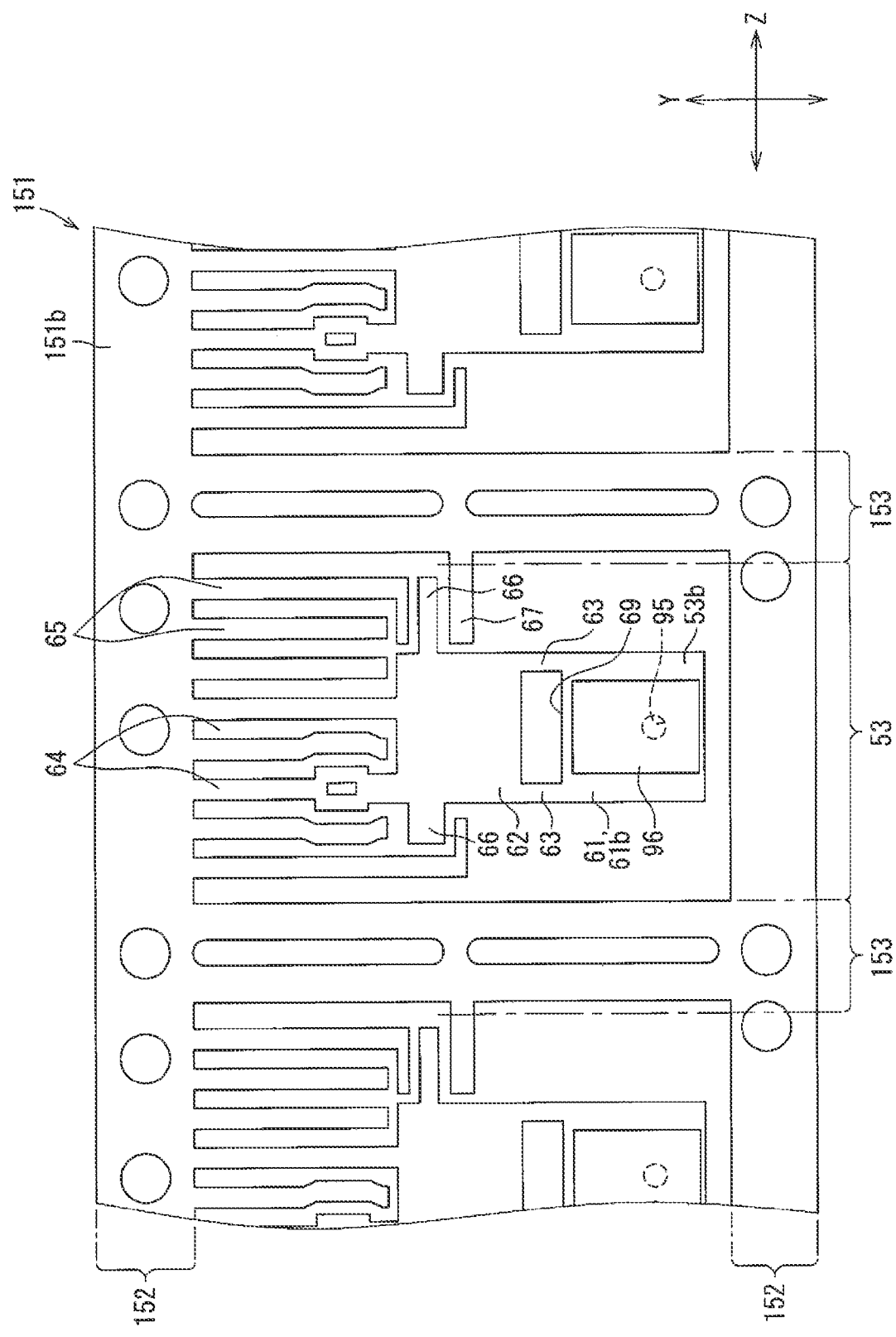
FIG. 18 is a plan view of the base material, in a state where the filter unit is attached to the SA substrate, when viewed from the back side.
Figure 19:
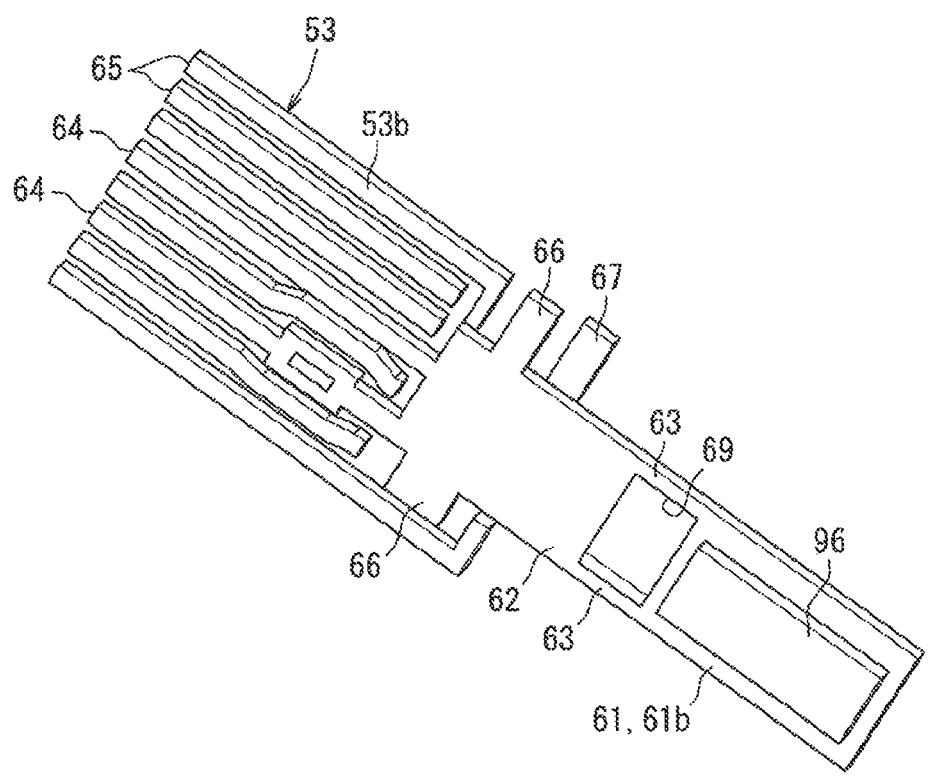
FIG. 19 is a perspective view of the SA substrate, in a state where the filter unit attached, when viewed from the back side.
Figure 19:
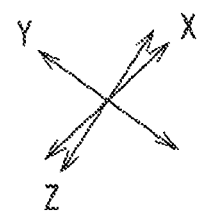

Next, a step of attaching the filter unit 96 to the punching surface 151b of the base material 151 is performed. In this step, as shown in FIGS. 17 to 19, the filter unit 96 is attached to the back surface 53b of each of the SA substrates 53 in the base material 151. In this case, the filter unit 96 is attached to the back surface 61b of the detection frame 61 using an adhesive or the like so that the filter unit 96 covers the detection frame hole 95. In this way, by attaching the filter unit 96 to the punching surface 151b, it is less likely that the filter unit 96 will be damaged by the burrs remaining on the punched surface 151a. For example, unlike the present embodiment, in a configuration in which the filter unit 96 is attached to the punched surface 151a, the filter unit 96 will be damaged by the burrs remaining on the punched surface 151a, and thus the foreign particle removing performance of the filter unit 96 may deteriorate.

Figure 20:
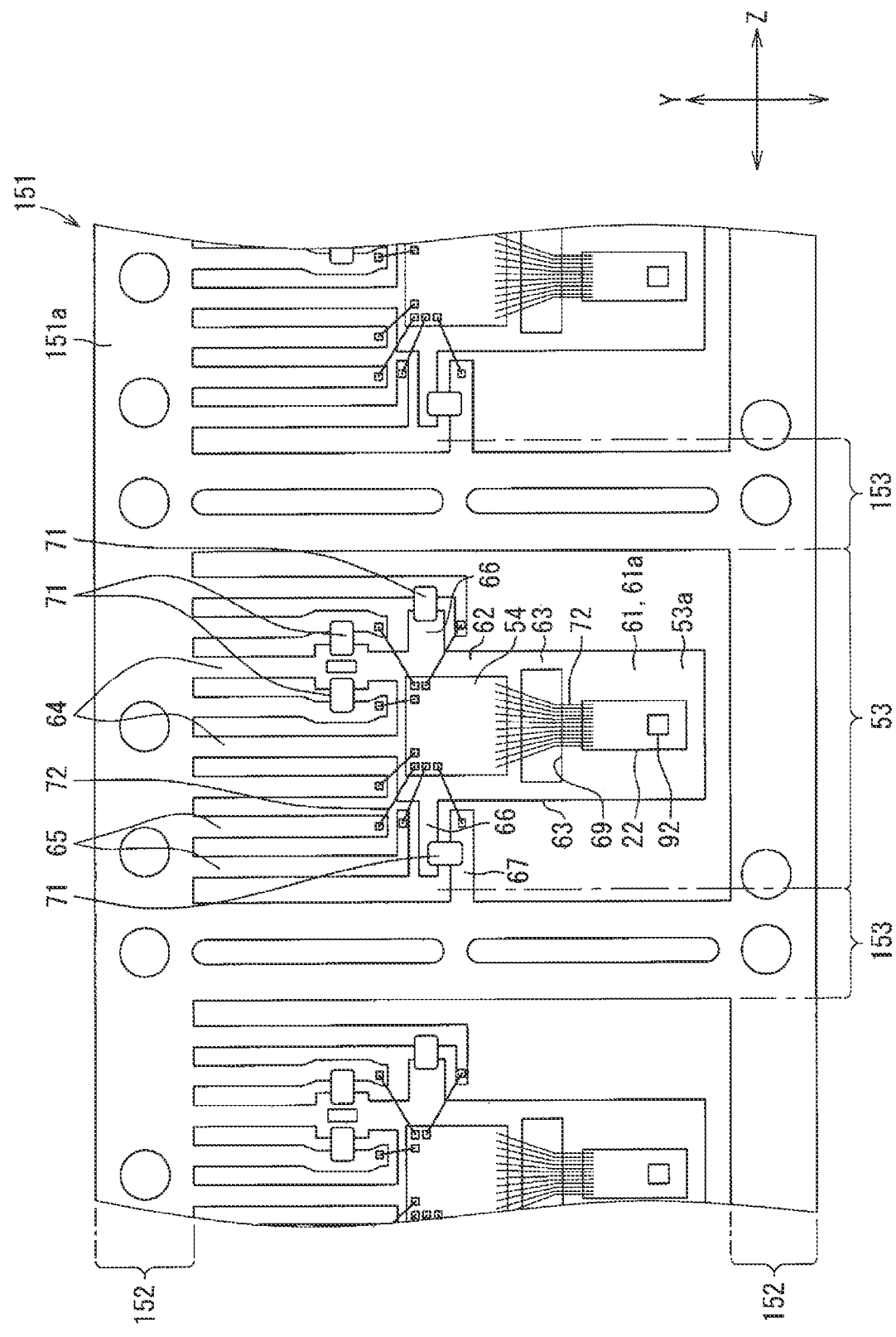
FIG. 20 is a plan view of the base material, in a state where a chip component is attached to the SA substrate, when viewed from the front side.
Figure 21:
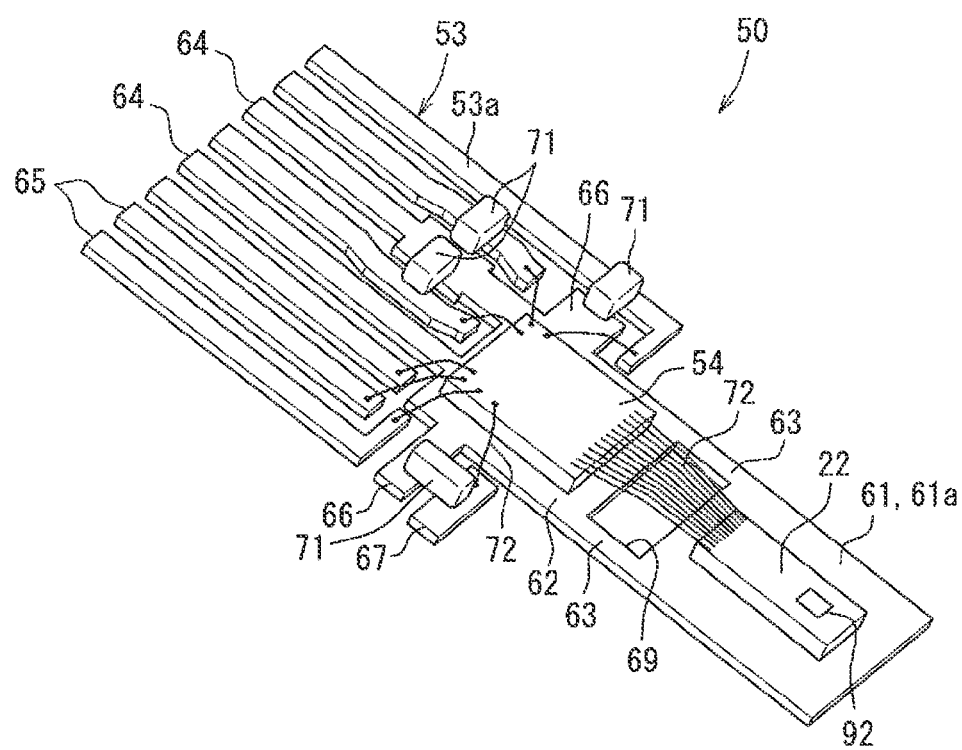
FIG. 21 is a perspective view of the SA substrate, in a state where the chip component is attached, when viewed from the front side.
Figure 21:
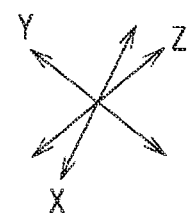

Further, a step of attaching a chip component such as the flow rate detection unit 22 to the punched surface 151a of the base material 151 is performed. In this step, as shown in FIGS. 20 and 21, chip components such as the flow rate detection unit 22, the flow rate processor 54, and the protection chip 71 are mounted on each of the SA substrates 53 in the base material 151. Then, a wire bonding is performed to these chip components and the SA substrate 53, so that the bonding wires 72 are connected to the flow rate detection unit 22, the flow rate processor 54, the circuit lead terminal 65, the circuit protection frame 67, and the like.

Here, when the flow rate detection unit 22 is attached to the punched surface 151a, there is a concern that the flow rate detection unit 22 may be damaged by the burrs remaining on the punched surface 151a. Specifically, there is a concern that burrs remaining on the peripheral edge portion of the front opening 95a of the detection frame 61 may come into contact with the back surface 22b of the flow rate detection unit 22. On the other hand, as described above, the front opening 95a is sufficiently smaller than the recess opening 91c so that the peripheral edge portion of the front opening 95a of the detection frame 61 is arranged at a position spaced apart inwardly from the peripheral edge portion of the recess opening 91c of the flow rate detection unit 22. Therefore, even if the burrs remain on the peripheral edge portion of the front opening 95a of the detection frame 61, since the flow rate detection unit 22 is attached to the detection frame 61 so that the front opening 95a is arranged inside the peripheral edge portion of the recess opening 91c, damage to the flow rate detection unit 22 due to burrs can be avoided.

Figure 22:
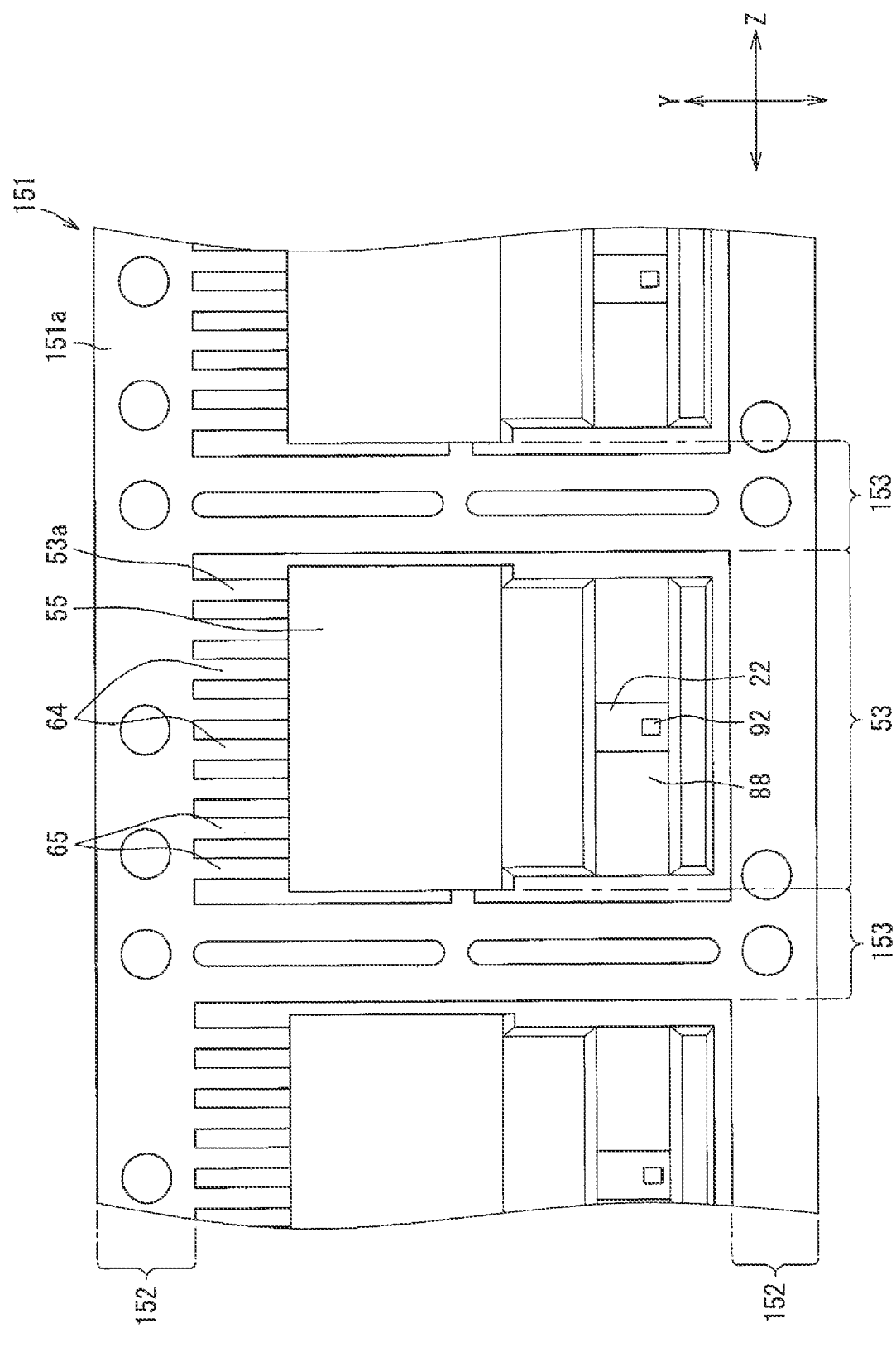
FIG. 22 is a plan view of the base material, in a state where a molded unit is attached to the SA substrate, when viewed from the front side.

Subsequently, a step of attaching the molded part 55 to the base material 151 is performed. This step can also be referred to as a molding step of molding the molded part 55. In this step, as shown in FIG. 22, the molded part 55 is attached to each of the SA substrates 53 in the base material 151 so as to cover the flow rate detection unit 22, the flow rate processor 54, the protection chip 71, the bonding wire 72, and the filter unit 96. Further, in this step, a mold device 160 is mounted on each of the SA substrates 53 of the base material 151, and the molded part 55 is resin-molded by the mold device 160.

Figure 23:
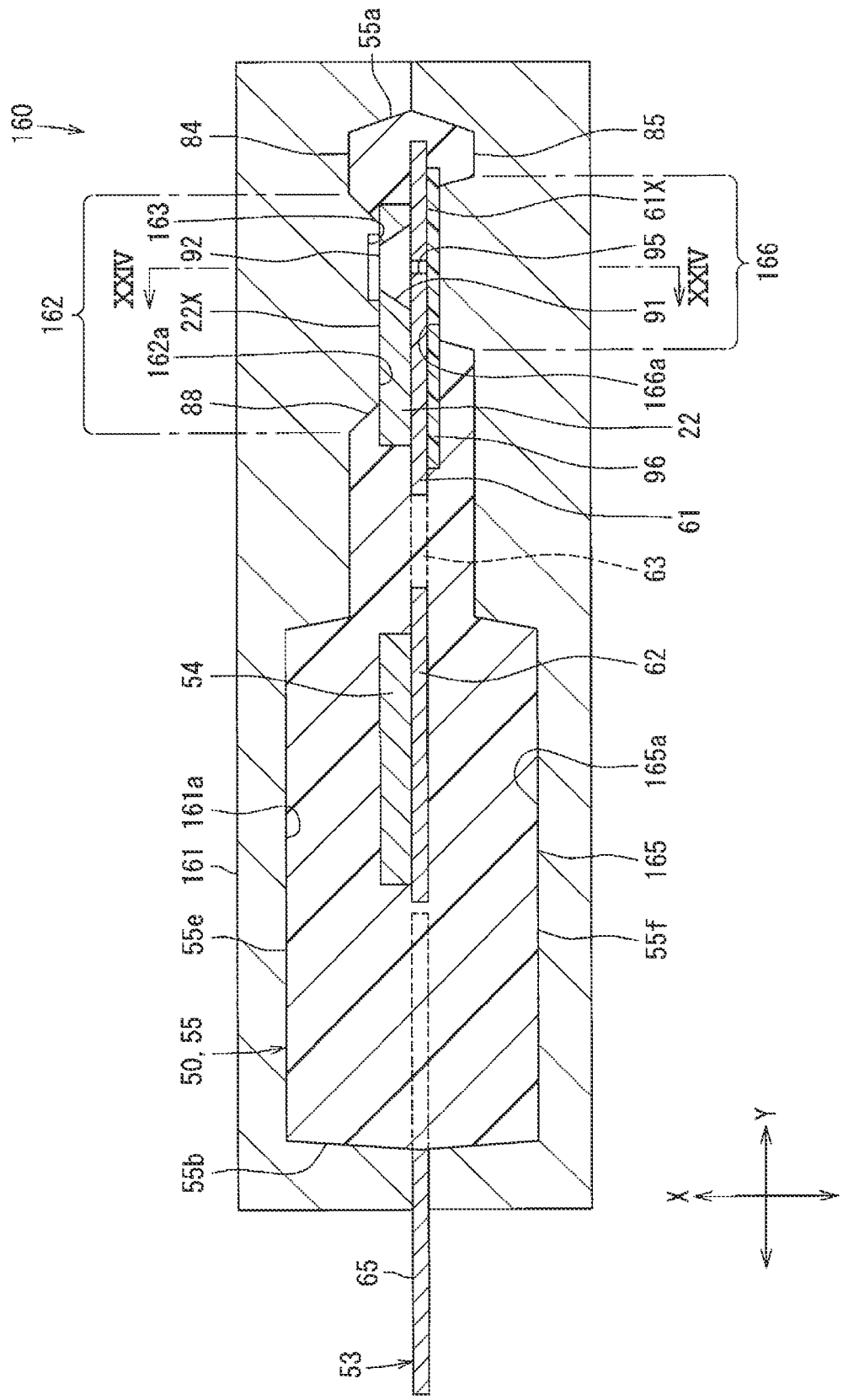
FIG. 23 is a vertical cross-sectional view for showing a configuration of a mold device.
Figure 24:
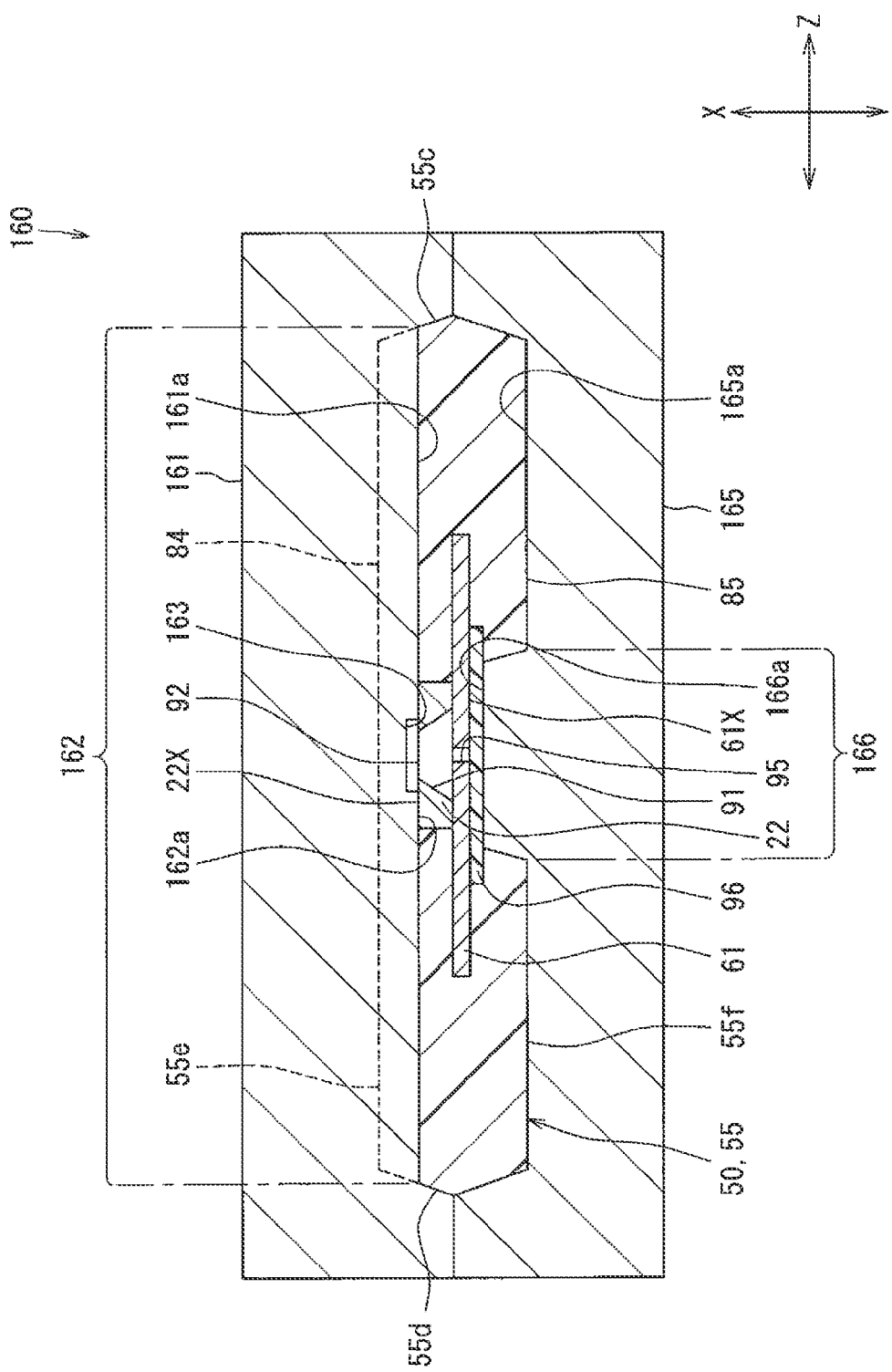
FIG. 24 is a cross-sectional view taken along a line XXIV-XXIV in FIG. 23.

As shown in FIGS. 23 and 24, the mold device 160 has a front mold unit 161 for molding the front cover portion 84 of the molded part 55 and a back mold unit 165 for molding the back cover portion 85 of the molded part 55. Regarding the outer peripheral surface of the molded part 55, when the surface adjacent to the front cover portion 84 is referred to as a front surface 55e and the surface adjacent to the back cover portion 85 is referred to as a back surface 55f, the front mold unit 161 includes a front mold recess 161a for molding the front surface 55e of the molded part 55. Further, the back mold unit 165 has a back mold recess 165a for molding the back surface 55f of the molded part 55.

The front mold unit 161 has a groove molding portion 162 for molding the front mold groove 88 in the molded part 55. The groove molding portion 162 is a protruding portion that protrudes so that the bottom surface of the front mold recess 161a expands. The groove molding portion 162 is gradually tapered off toward the tip surface 162a thereof, and has a tapered shape as a whole. When the mold device 160 is mounted on the SA substrate 53, the tip surface 162a of the groove molding portion 162 is in a state of being pressed against the front extension region 22X of the flow rate detection unit 22. The groove molding portion 162 is a portion that is in contact with the front extension region 22X for exposing the membrane part 92 and the front extension region 22X, and corresponds to a front exposure molding portion.

The groove molding portion 162 is provided with an avoidance recess 163 that restricts the groove molding portion 162 from coming into contact with the membrane part 92, in the state where the mold device 160 is mounted on the SA substrate 53. The avoidance recess 163 is formed as a recess recessed from the tip surface 162a of the groove molding portion 162, and the open end of the avoidance recess 163 is larger than the membrane part 92. When the mold device 160 is mounted on the SA substrate 53, the peripheral edge of the open end of the avoidance recess 163 is spaced apart from the membrane part 92 toward the outer peripheral side. Further, the tip surface 162a of the groove molding portion 162 has an annular shape since the surface 162a surrounds the peripheral edge portion of the avoidance recess 163.

The back mold unit 165 has a hole molding portion 166 for forming the back mold hole 87 in the molded part 55. The hole molding portion 166 is a protruding portion that protrudes so that the bottom surface of the back mold recess 165a expands. The hole molding portion 166 is gradually tapered off toward the tip surface 166a thereof, and has a tapered shape as a whole. When the mold device 160 is mounted on the SA substrate 53, the tip surface 166a of the hole molding portion 166 is in a state of being pressed against the back extension region 61X via the filter unit 96. The hole molding portion 166 is a portion that is in contact with the filter unit 96 for exposing the detection frame hole 95 and the back extension region 61X through the filter unit 96, and corresponds to a back exposure molding portion.

In the state where the back mold unit 165 is mounted on the SA substrate 53, the tip surface 166a of the hole molding portion 166 is in contact with the portion of the filter unit 96 that is overlapped with the back extension region 61X of the detection frame 61. In the present embodiment, this state is also referred to as a state in which the tip surface 166a of the hole molding portion 166 is in contact with the back extension region 61X via the filter unit 96.

In a process for molding the molded part 55, the mold device 160 is assembled so that the SA substrate 53 of the base material 151 is held between the front mold unit 161 and the back mold unit 165, and is clamped. Thus, the mold device 160 is mounted on the base material 151. Then, a molten resin is injected into the internal space of the mold device 160 from an injection port formed in the mold device 160 and filled therein. The internal space of the mold device 160 is provided by the internal spaces of the front mold recess 161a and the back mold recess 165a. The mold device 160 has a plurality of front mold recesses 161a and back mold recesses 165a. Thus, the mold device 160 can mold a plurality of molded parts 55.

When the mold device 160 is mounted on the SA substrate 53, the tip surface 162a of the groove molding portion 162 of the front mold unit 161 is overlapped with the front extension region 22X, and the tip surface 166a of the hole molding portion 166 of the back mold unit 165 is overlapped with the back extension region 61X via the filter unit 96. In this state, the groove molding portion 162 and the hole molding portion 166 are in a state of pressing the flow rate detection unit 22 and the detection frame 61 against indirections approaching each other. Therefore, when the molten resin is injected into the mold device 160, it is possible to restrict the molten resin from penetrating into an unintended portion. Specifically, it is possible to restrict the molten resin from penetrating between the tip surface 162a of the groove molding portion 162 and the front extension region 22X, between the tip surface 166a of the hole molding portion 166 and the back extension region 61X, and between the back surface 22b of the flow rate detection unit 22 and the front surface 61a of the detection frame 61.

Further, since the avoidance recess 163 is formed on the tip surface 162a of the groove molding portion 162, the tip surface 162a does not come into contact with the membrane part 92 even when the groove molding portion 162 is pressed against the front extension region 22X. Therefore, it is less likely that the membrane part 92 will be pressed by the groove molding portion 162 and be deformed. Moreover, in the groove molding portion 162 of the surface mold unit 161, the tip surface 162a thereof has a ring shape so as to surround the avoidance recess 163. Therefore, it is less likely that the molten resin will penetrate into the avoidance recess 163 through between the front end surface 162a of the groove molding portion 162 and the back extension region 61X.

Further, since each of the front extension region 22X and the back extension region 61X is as large as possible, pressures applied from the groove molding portion 162 and the hole molding portion 166 to the front extension region 22X and the back extension region 61X are easily dispersed in these extension regions 22X and 61X. For example, the smaller the front extension region 22X is, the less the pressure applied from the groove molding portion 162 to the front extension region 22X disperses. In such a case, there is a concern that the flow rate detection unit 22 may be deformed or damaged. Similarly, the smaller the back extending region 61X is, the less the pressure applied from the hole molding portion 166 to the back extending region 61X disperses. Thus, there is a concern that the detection frame 61 and the filter unit 96 may be deformed or damaged.

In the front mold unit 161, the groove molding portion 162 can be moved in the width direction X with respect to other portions, and thus the pressure that the groove molding portion 162 is pressed against the front extension region 22X can be adjusted. For this reason, under a condition that the molten resin is restricted to penetrate between the tip surface 162a of the groove molding portion 162 and the front extension region 22X, the groove molding portion 162 can be pressed against the front extension region 22X with a pressure that does not cause the flow rate detection unit 22 to be deformed or damaged.

Further, the mold device 160 is mounted on the base material 151 in a state where a mold filter made of fluororesin or the like is attached to the inner peripheral surface of the front mold recess 161a. With this mold filter, it is possible to suppress that the pressure applied from the groove molding portion 162 to the front extension region 22X and the pressure applied from the hole molding portion 166 to the back extension region 61X vary from product to product.

After the molten resin filled inside the mold device 160 is cured, the mold device 160 is disassembled to remove the front mold unit 161 and the back mold unit 165 from the base material 151 and the molded part 55. Thus, as shown in FIG. 22, the plurality of sensor SAs 50 are in the states being connected through the bridging leads 152 and the connecting lead 153 in the base material 151.

Next, a step of removing the sensor SA 50 from the leads 152 and 153 is performed. In this step, tie bar cutting is performed. Here, the lead terminals 64 and 65 are separated from the bridging lead 152, and the circuit protection frame 67 is separated from the connecting lead 153. Therefore, as shown in FIGS. 4 and 5, the cut surface of the circuit protection frame 67 is exposed to the side of the sensor SA 50 on the mold downstream surface 55d. The cut surface of the circuit protection frame 67 may be coated with resin or the like.

After the sensor SA 50 is completed, the sensor SA 50 is installed in the internal space 24a of the molded housing 21. Then, the lead terminals 64 and 65 of the sensor SA 50 are connected to the connector terminals 28a. In this case, the back surfaces of the lead terminals 64 and 65 are brought into contact with the connector terminals 28a. As described above, the back surfaces of the lead terminals 64 and 65 are formed by the punching surface 151b of the base material 151. Therefore, even if burrs remain on the peripheral edges of the lead terminals 64 and 65 on the punched surface 151a, it is less likely that the burrs will come into contact with the connector terminal 28a. In this case, it is possible to restrict a burr from being interposed between the lead terminals 64 and 65 and the connector terminal 28a and from causing insufficient contact between the lead terminals 64 and 65 and the connector terminal 28a.

According to the present embodiment described so far, the front opening 95a of the detection frame hole 95 is arranged at a position spaced apart inwardly from the peripheral edge portion of the recess opening 91c of the detection recess 91 in the flow rate detection unit 22. Therefore, even if burrs remain on the peripheral edge portion of the front opening 95a in the detection frame 61, the burrs are located inside of the front opening 95a. Thus, the burrs are less likely to come into contact with the flow rate detection unit 22. Moreover, since the detection recess 91 is opened to the outside through the detection frame hole 95, it is possible to suppress the membrane part 92 from being deformed due to the pressure difference and the detection accuracy of the flow rate detection unit 22 from being lowered. Therefore, in the configuration where the detection accuracy of the flow rate detection unit 22 is improved by the detection frame hole 95, it is less likely that the burrs will come into contact with the flow rate detection unit 22 and the flow rate detection unit 22 will be damaged due to the burrs.

According to the present embodiment, the front opening 95a of the detection frame 61 is arranged at a position spaced apart inwardly from both the peripheral edge portion of the recess opening 91c of the detection recess 91 and the peripheral edge portion of the membrane part 92. In this case, for example, even if the inner wall surface 91b of the detection recess 91 is inclined with respect to the center line CL, the burrs extending from the peripheral edge portion of the front opening 95a are located on the inner peripheral side of the inner wall surface 91b. Therefore, it is possible to restrict the inner wall surface 91b of the detection recess 91 from being damaged or broken by burrs.

According to the present embodiment, the flow rate detection unit 22 having a burr countermeasure in which the recess opening 91c is larger than the front opening 95a is attached to the front surface 61a of the detection frame 61 on which the burrs are likely to occur. On the other hand, the filter unit 96 without the burr countermeasure is attached to the back surface 61b on which burrs are unlikely to occur. Therefore, even if the burr countermeasure is applied only to the flow rate detection unit 22 of the flow rate detection unit 22 and the filter unit 96, it is possible to restrict the filter unit 96 from being damaged by burrs.

According to the present embodiment, the inner diameter L3 of the front opening 95a of the detection frame hole 95 is larger than the thickness dimension D1 of the detection frame 61. In this case, it is possible to suppress the ventilation of the detection recess 91 through the detection frame hole 95 from being restricted due to the increase in pressure loss at the detection frame hole 95 because of the front opening 95a being excessively small with respect to the thickness of the detection frame 61.

In the present embodiment, the front extension region 22X of the flow rate detection unit 22 and the back extension region 61X of the detection frame 61 are arranged in the width direction X. Therefore, when the molded part 55 is molded with a resin using the mold device 160, the front mold unit 161 presses against the front extension region 22X, and the back mold unit 165 presses against the back extension region 61X. As a result, the back surface 22b of the flow rate detection unit 22 and the front surface 61a of the detection frame 61 can be brought into close contact with each other. In this case, it is less likely that a molten resin filled inside the mold device 160 will enter an unintended portion such as between the flow rate detection unit 22 and the detection frame 61.

In the present embodiment, the size of the back mold hole 87 in the width direction gradually reduces toward the detection frame 61. In this case, the air flowing along the back surface 55f of the molded part 55 reaches the detection frame hole 95 by gradually changing its direction along the inner peripheral surface 87b of the back mold hole 87. Therefore, turbulence of the air flow is less likely to occur around the back mold hole 87, and air can easily enter and exit the detection recess 91 through the back mold hole 87 and the detection frame hole 95.

Moreover, in the mold device 160 for molding the molded part 55, the hole molding portion 166 for molding the inner peripheral surface 87b of the back mold hole 87 in the back mold unit 165 gradually reduces in size toward the tip surface 166a. Therefore, when the back mold unit 165 is removed from the molded part 55 after the molten resin is cured, it is easy to separate the hole molding portion 166 from the back mold hole 87. In this case, when the hole molding portion 166 is pulled out from the back mold hole 87, it is less likely that the hole molding portion 166 will be in close contact with the inner peripheral surface of the back mold hole 87 to pull the back cover portion 85 to the back side. That is, when the back mold unit 165 is removed from the molded part 55, it is less likely that the filter unit 96, the detection frame 61, and the flow rate detection portion 22 will be deformed due to the back cover portion 85 being pulled to the back side. As described above, since the stress applied to the flow rate detection unit 22 when the back mold unit 165 is removed from the molded part 55 is reduced, it is less likely that the flow rate detection unit 22 will be deformed with the removal of the back mold unit 165, and the detection accuracy of the flow rate detection unit 22 will be degraded.

According to the present embodiment, when the sensor SA 50 is manufactured, the flow rate detection unit 22 is attached to the punched surface 151a on which burrs are likely to occur on the base material 151, and the filter unit 96 is attached to the punching surface 151b on which burrs are unlikely to occur. In this configuration, by making the front opening 95a of the detection frame 61 smaller than the recess opening 91c of the flow rate detection unit 22, both the flow rate detection unit 22 and the filter unit 96 can be suppressed from being damaged by burrs.

According to the present embodiment, after the filter unit 96 is attached to the back surface 61b of the detection frame 61, the back cover portion 85 is molded so as to cover the peripheral edge portion of the filter unit 96 when the molded part 55 is molded. Therefore, the back cover portion 85 can regulate the peeling off of the filter unit 96 from the back surface 61b of the detection frame 61. Moreover, since the configuration for restricting the peeling of the filter unit 96 can be realized by performing the molding step of the molded part 55, it is not necessary to perform a dedicated process for restricting the peeling of the filter unit 96. Therefore, the configuration that regulates the peeling of the filter unit 96 can be realized at low cost.

According to the present embodiment, when the molded part 55 is molded, the groove molding portion 162 of the front mold unit 161 and the hole molding portion 166 of the back mold unit 165 interpose the flow rate detection unit 22 and the detection frame 61 therebetween. Therefore, it is possible to restrict the molten resin from entering an unintended portion such as between the flow rate detection unit 22 and the detection frame 61.

Second Embodiment

In the first embodiment described above, the cross-sectional area of the detection recess 91 gradually increases from the bottom surface 91a toward the recess opening 91c in the width direction X. In a second embodiment, however, the cross-sectional area of the detection recess 91 does not gradually increase toward the recess opening 91c. Specifically, the cross-sectional area of the detection recess 91 is made uniform in the width direction X. In the present embodiment, differences from the first embodiment will be mainly described.

Figure 25:
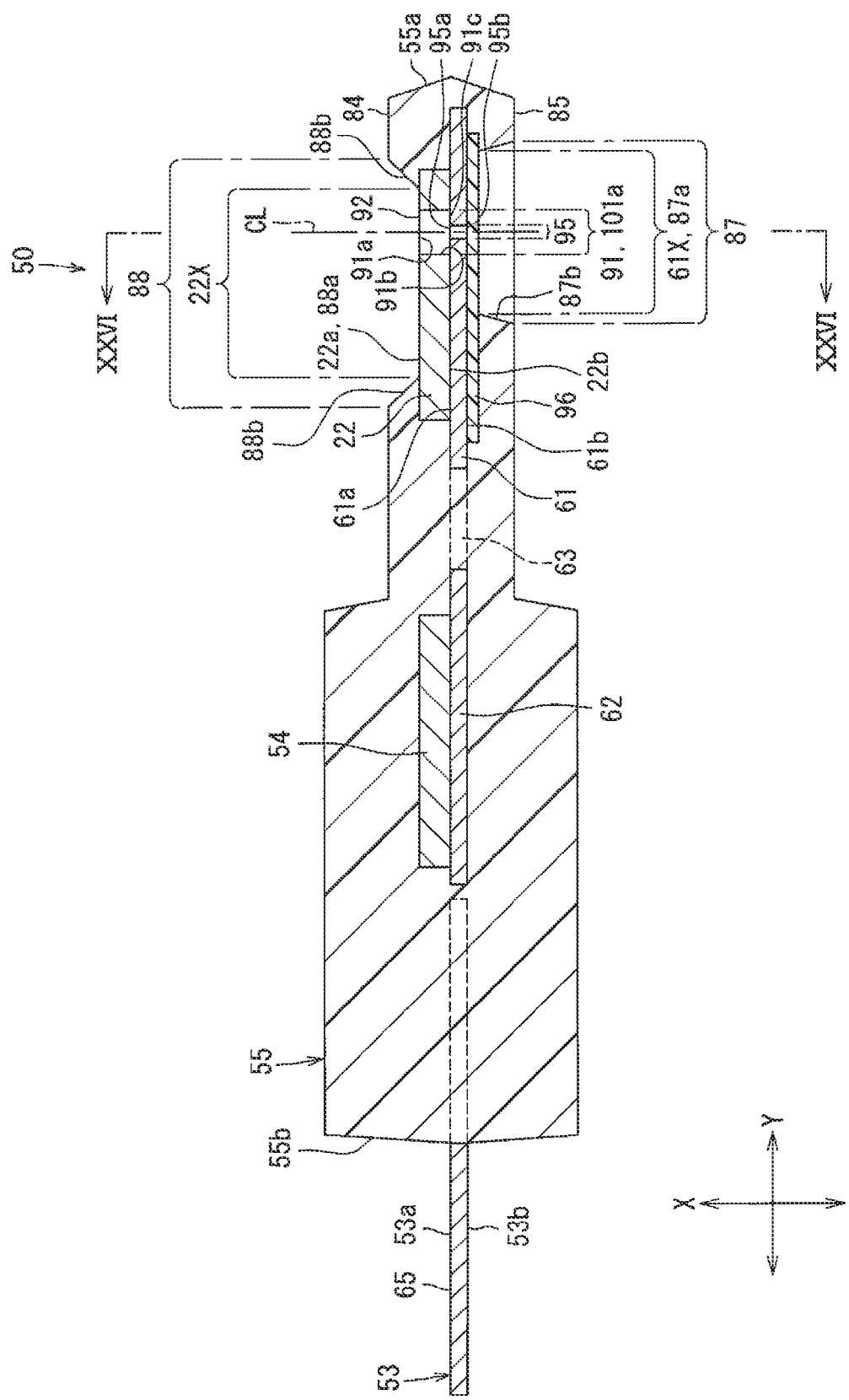
FIG. 25 is a vertical cross-sectional view of a sensor SA according to a second embodiment.
Figure 26:
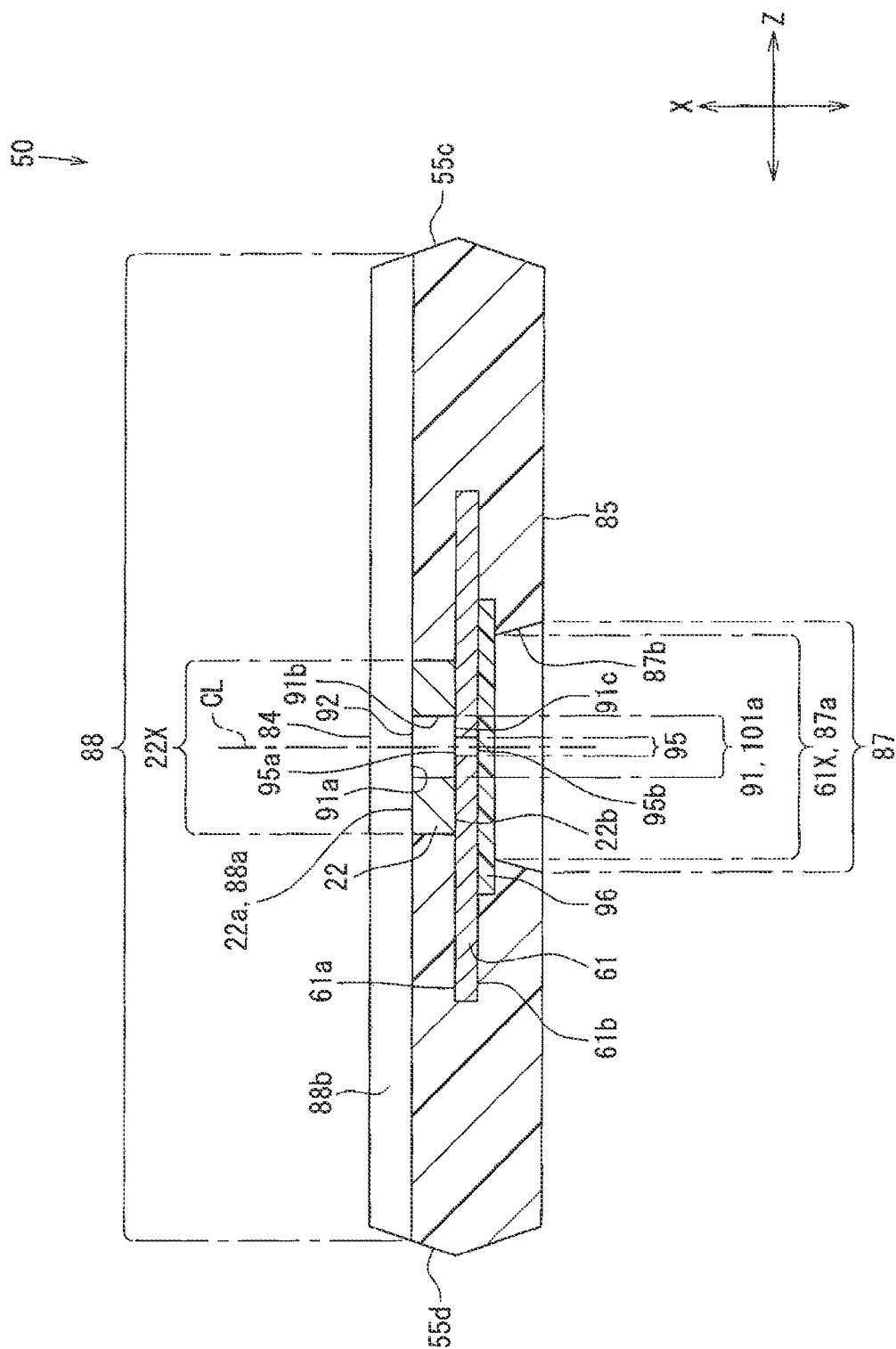
FIG. 26 is a cross-sectional view taken along a line XXVI-XXVI in FIG. 25.

As shown in FIG. 25 and FIG. 26, the inner wall surface 91b of the detection recess 91 extends parallel to the center line CL from the bottom surface 91a toward the recess opening 91c. In the detection recess 91, the area of the bottom surface 91a and the open area of the recess opening 91c are the same because the cross-sectional area in the direction orthogonal to the center line CL is uniform in the width direction X. In the detection base material 101 of the flow rate detection unit 22, the dimension of the base material hole 101a forming the detection recess 91 is uniform in the width direction X. Even in this case, the front opening 95a of the detection frame hole 95 is spaced apart inwardly from both of the recess openings 91c of the detection recess 91 and the peripheral edge portion of the bottom surface 91a.

In the present embodiment, in the flow rate detection unit 22, the base material hole 101a is formed by processing a part of the detection base material 101 by dry etching. That is, the detection recess 91 and the membrane part 92 are formed by dry etching. In this case, in the detection recess 91, the recess opening 91c is not larger than the membrane part 92. Even if the recess opening 91c is larger than the membrane part 92, the recess opening 91c is only slightly larger than the membrane part 92.

According to the present embodiment, the recess opening 91c of the detection recess 91 has substantially the same size as the membrane part 92. Therefore, as compared with a configuration in which the recess opening 91c is larger than the membrane part 92 as in the first embodiment, for example, the back extension region 61X formed on the back surface 22b of the flow rate detection unit 22 is larger by the amount that the recess opening 91c is reduced. In this case, when the molded part 55 is molded by using the mold device 160, the area where the hole molding portion 166 of the back mold unit 165 contacts the back surface 22b of the flow rate detection unit 22 is increased, so that pressure applied from the tip surface 166a of the hole molding portion 166 to the back extension region 61X is easily dispersed. In this way, since the pressing area of the flow rate detection unit 22 by the hole molding portion 166 is increased, it is possible to suppress the flow rate detection unit 22 from being deformed or damaged due to the pressing by the hole molding portion 166.

Third Embodiment

In the first embodiment described above, the peripheral edge portion of the filter unit 96 is covered by the molded part 55. In the third embodiment, however, the peripheral edge portion of the filter unit 96 is not covered by the molded part 55. That is, in the first embodiment, the peripheral edge portion of the filter unit 96 is not exposed on the back side of the sensor SA 50. In the third embodiment, on the other hand, the entirety of the filter unit 96 including the peripheral edge portion of the filter unit 96 is exposed on the back side of the sensor SA 50. In the present embodiment, differences from the first embodiment will be mainly described.

Figure 27:
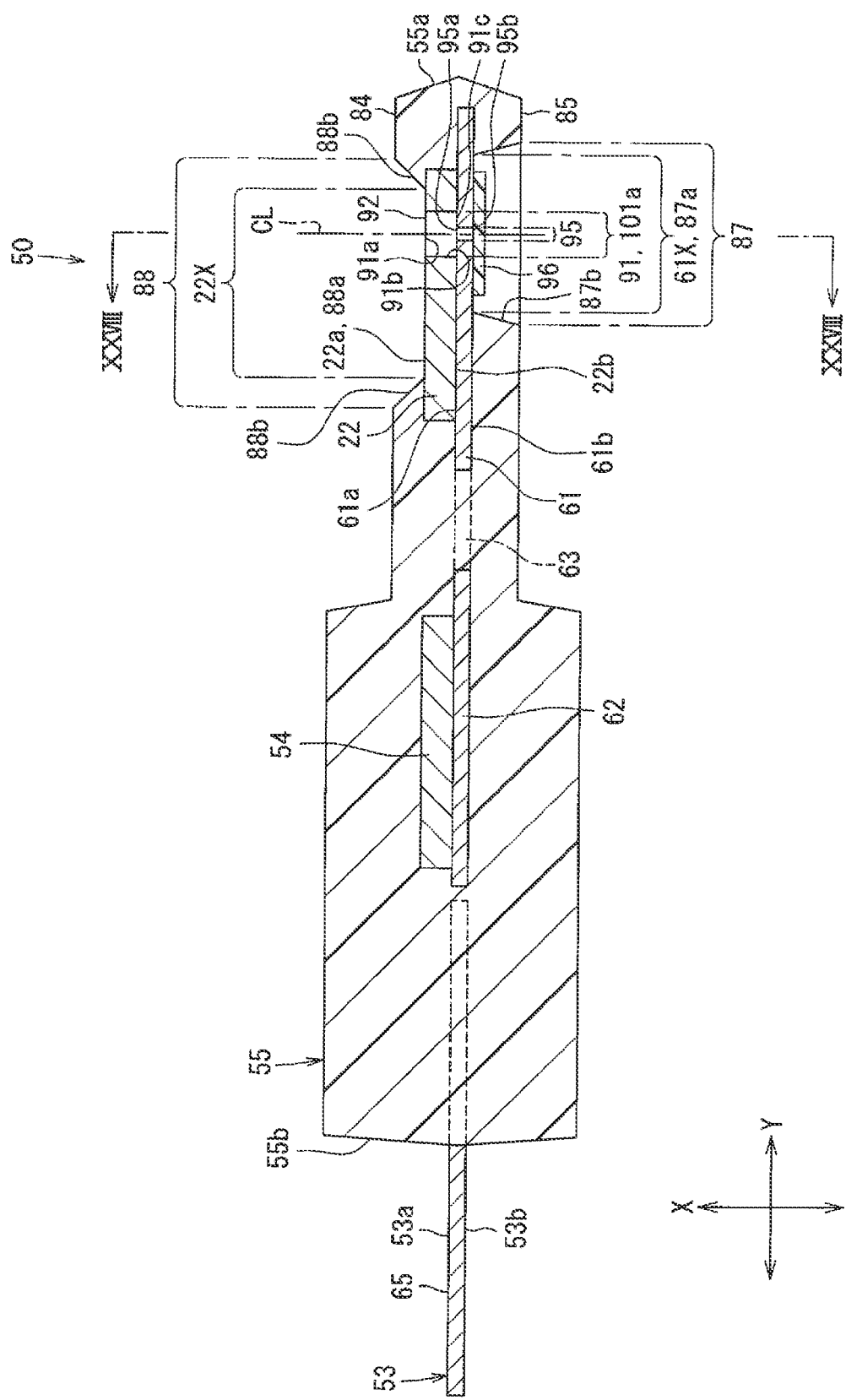
FIG. 27 is a vertical cross-sectional view of a sensor SA according to a third embodiment.
Figure 28:
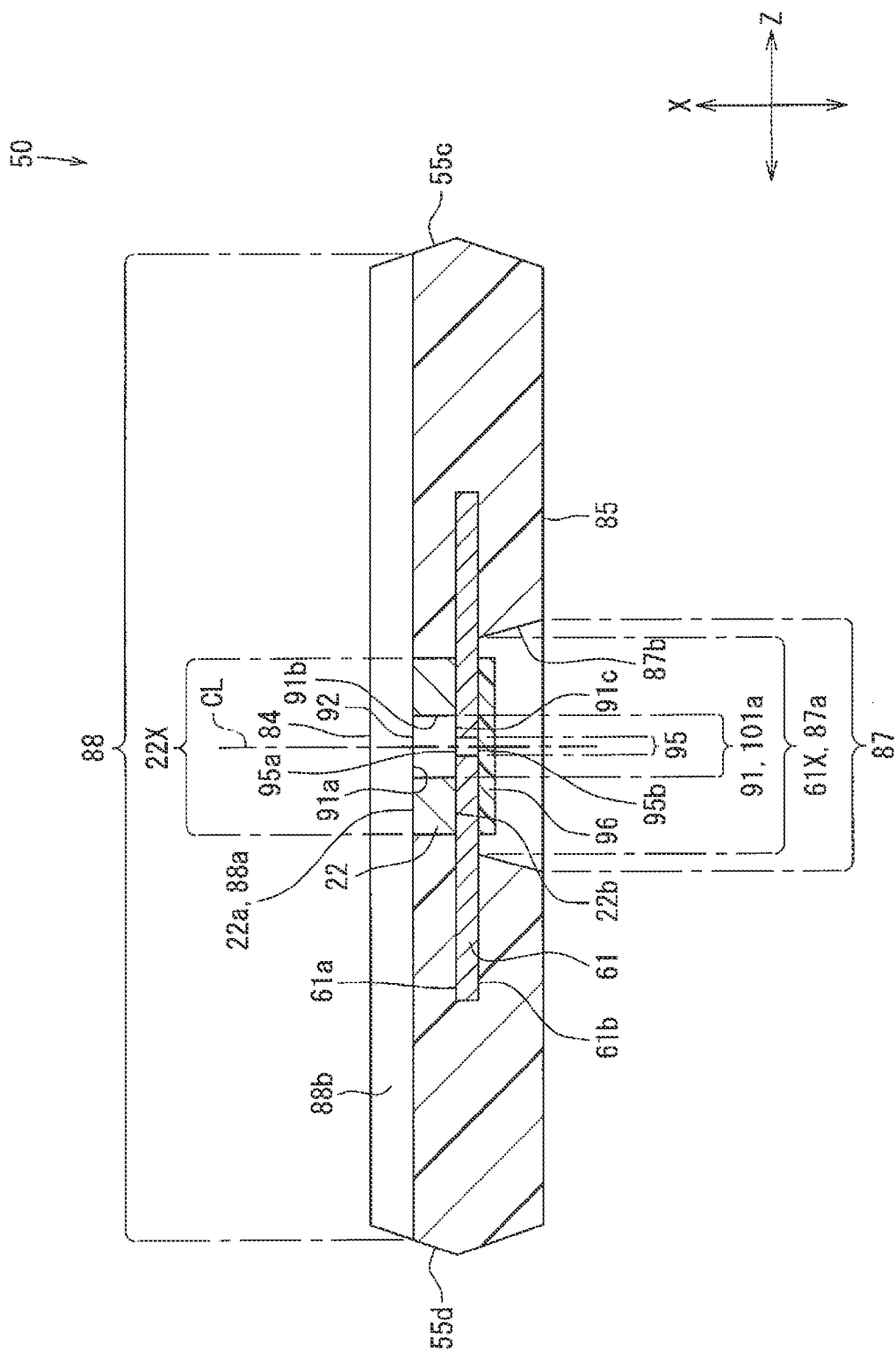
FIG. 28 is a cross-sectional view taken along a line XXVIII-XXVIII in FIG. 27.

As shown in FIG. 27 and FIG. 28, the filter unit 96 is smaller than the outer peripheral end of the back extension region 61X of the detection frame 61. In this case, the filter unit 96 is smaller than the back mold hole 87, and the peripheral edge portion of the filter unit 96 is spaced apart, toward the inner peripheral side, from the peripheral edge portion of the front end 87a of the back mold hole 87. Further, in the detection frame 61, the front opening 95a and the back opening 95b of the detection frame hole 95 have the same size and shape, and both the front opening 95a and the back opening 95b are spaced apart, toward the inner peripheral side, from the inner peripheral surface of the recess opening 91c of the detection recess 91. The filter unit 96 may be in contact with the inner peripheral surface 87b of the back mold hole 87 as long as the filter unit 96 is in a state of covering the detection frame hole 95.

In the first embodiment, in the method for manufacturing the airflow meter 20, the molded part 55 is molded after the filter unit 96 is attached to the detection frame 61, in the method for manufacturing the airflow meter 20. In the present embodiment, however, the filter unit 96 is attached to the detection frame 61 after the molded part 55 is molded.

In the molding process of the molded part 55, in a state where the mold device 160 is attached to the SA substrate 53, the tip surface 166a of the hole molding portion 166 is in direct contact with the back extension region 61X of the detection frame 61 without through the filter unit 96 on the back mold unit 165. In the step of attaching the filter unit 96 to the detection frame 61 after molding the molded part 55, the filter unit 96 is attached to the back extension region 61X of the detection frame 61 at the position spaced apart from the inner peripheral surface 87b of the back mold hole 87 toward the inner peripheral side, with an adhesive or the like.

According to this embodiment, at the time of manufacturing the airflow meter 20, the filter unit 96 is attached to the detection frame 61 after the molded part 55 is molded. Therefore, for example, differently from a configuration in which the molded part 55 is molded after the filter unit 96 is attached to the detection frame 61, the filter unit 96 will not be displaced or peeled off from the detection frame 61 with the molding of the molded part 55. Moreover, the back opening 95b of the detection frame hole 95 is spaced apart from the peripheral edge portion of the recess opening 91c of the detection recess 91 toward the inner peripheral side. In this case, for example, as compared with a configuration in which the back opening 95b is the same size as or larger than the recess opening 91c, the back extension region 61X is larger by the reduced amount of the back opening 95b. Therefore, the attaching area of the filter unit 96 with respect to the back extension region 61X can be increased. As described above, since the filter unit 96 can be firmly adhered to the back surface of the detection frame 61, the filter unit 96 will not be peeled off from the detection frame 61 even if the peripheral edge portion of the filter unit 96 is not covered with the molded part 55.

Other Embodiments

Although a plurality of embodiments according to the present disclosure have been described above, the present disclosure is not construed as being limited to the embodiments described above, and can be applied to various embodiments and combinations within a scope not departing from the spirit of the present disclosure.

As a first modification, the front opening 95a of the detection frame hole 95 may be smaller than the recess opening 91c of the detection recess 91, but may be larger than the membrane part 92. In this case, if the inner wall surface 91b of the detection recess 91 is curved so as to expand toward the outer peripheral side, it is possible to restrict burrs remaining on the peripheral edge portion of the front opening 95a from coming into contact with the inner wall surface 91b.

As a second modification, it is not always necessary that the width of the detection frame hole 95 is constant. For example, the inner peripheral surface of the detection frame hole 95 is inclined with respect to the center line CL. Further, the detection frame hole 95 may not be a round hole. For example, the cross-sectional shape of the detection frame hole 95 may be rectangular or elliptical. In any configuration, as long as the front opening 95a of the detection frame hole 95 is spaced apart from the peripheral edge portion of the recess opening 91c of the detection recess 91 toward the inner peripheral side, it is possible to restrict burrs remaining on the peripheral edge portion of the front opening 95a from coming into contact with the flow rate detection unit 22.

Further, in the configuration in which the cross-sectional shape of the detection frame hole 95 is not circular, it is preferable that the separation distance defined between the portions of the peripheral portion of the front opening 95a facing each other across the center line CL with the smallest separation distance is larger than the thickness dimension D1. For example, in a configuration in which the front opening 95a has a rectangular shape, it is preferable that the separation distance between the pair of sides facing each other in the front opening 95a is larger than the thickness dimension D1 of the detection frame 61. As a result, it is less likely that the ventilation of the detection recess 91 will be restricted due to the front opening 95a being excessively small.

As a third modification, the thickness dimension of the SA substrate 53 may be not be uniform. Even in this case, it is preferable that the inner diameter L3 of the front opening 95a of the detection frame hole 95 is larger than the thickness dimension of the portion of the detection frame 61 where the detection frame hole 95 is formed. As a result, it is possible to restrict the front opening 95a from being too small to form the detection frame hole 95 in the detection frame 61.

As a fourth modification, the size of the back mold hole 87 may not be gradually reduced toward the detection frame 61 in the width direction X. For example, the back mold hole 87 may be formed to have a constant width at any portion in the width direction X. Further, the back mold hole 87 may not be a round hole. For example, the front end 87a of the back mold hole 87 has a rectangular or elliptical shape.

In each of the above described embodiments, the front mold groove 88 is formed in the molded part 55. Alternatively, as a fifth modification, the membrane part 92 of the flow rate detection unit 22 and the front extension area 22X may be exposed on the front side of the sensor SA 50 by forming a hole passing through the front cover portion 84. Further, in each of the above described embodiments, the back mold hole 87 is formed in the back cover portion 85. Alternatively, a groove communicating with the back opening 95b of the detection frame hole 95 may be formed in the molded part 55.

As a sixth modification, the front surface 61a of the detection frame 61 may be exposed on the front side of the sensor SA 50, in place of or in addition to the back surface 61b of the detection frame 61 in each of the above described embodiments. In this case, even if heat is transferred from the processor frame 62 to the detection frame 61, the heat can be released to the outside from the surface 61a of the detection frame 61.

As a seventh modification, the SA substrate 53 to which the flow rate detection unit 22 is attached may be configured to include a plate member having an insulating property such as a glass plate. For example, in the SA substrate 53, the detection frame 61 may be formed to include a glass plate.

As an eighth modification, the filter unit 96 may not be provided on the back surface 61b of the detection frame 61. Further, the filter unit 96 may be provided between the flow rate detection unit 22 and the detection frame 61. Even in this case, as long as the filter unit 96 covers the detection recess 91 from the back side, the filter unit 96 can restrict foreign matter from entering the detection recess 91.

As a ninth modification, the back extension region 61X may not be provided on the back surface 61b of the detection frame 61. For example, the peripheral edge portion of the front end 87a of the back mold hole 87, which is the inner peripheral end of the back cover portion 85, may overlap the peripheral edge portion of the back opening 95b of the detection frame hole 95. In this configuration, when the molded part 55 is molded, the back mold unit 165 does not come into contact with the back surface 61b of the detection frame 61 around the detection frame hole 95. Further, the surface extending region 22X may not be provided on the front surface 22a of the flow rate detecting unit 22. For example, the inner peripheral end of the front cover portion 84 is configured to overlap the peripheral edge portion of the membrane part 92. In this configuration, when the molded part 55 is molded, the front mold unit 161 does not come into contact with the front surface 22a of the flow rate detection unit 22 around the membrane part 92.

As a tenth modification, the sensor SA 50 may have a physical quantity detector that detects a physical quantity different from the flow rate for a fluid such as intake air. Examples of the physical quantity detector include a detection unit that detects temperature, a detection unit that detects humidity, and a detection unit that detects pressure. These detection units may be provided in the measurement flow path 32 or the passage flow path 31 inside the housing 21, or may be provided in the intake passage 12 outside the housing 21. In this case, the sensor SA 50 has a physical quantity processor into which the detection result of the physical quantity detected by the physical quantity detector is input.

What is claimed is:

1. A physical quantity measurement device for measuring a physical quantity of a fluid, comprising:
    a measurement flow path through which the fluid flows;
    a physical quantity detector that detects the physical quantity of the fluid in the measurement flow path; and
    a support plate part that supports the physical quantity detector in a state of being superposed on a back surface, which is a surface of the physical quantity detector, wherein
    the physical quantity detector includes:
        a recessed part defining a recess recessed from the back surface of the physical quantity detector; and
        a membrane part defining a bottom surface of the recessed part in the physical quantity detector and being provided with a detection element for detecting the physical quantity of the fluid,
    the support plate part is provided with a communication hole in an area covering the recessed part, the communication hole passing through the support plate part to be in communication with the recessed part,
    a peripheral edge portion of a hole opening, which is an end of the communication hole adjacent to the recessed part, is spaced apart inwardly from a peripheral edge portion of a recess opening, which is an end of the recessed part adjacent to the support plate part, the physical quantity measurement device further comprises a body covering the physical quantity detector and the support plate part, the body includes a detection body portion that covers a front surface of the physical quantity detector opposite to the back surface in a state of exposing the membrane part and a front extension region of the front surface of the physical quantity detector extending from the membrane part, and a support body portion that covers a back plate surface of the support plate part opposite to the physical quantity detector in a state of exposing the communication hole and a back extension region of the back plate surface extending from the communication hole, the front extension region and the back extension region are aligned in a direction in which the physical quantity detector and the support plate part are aligned, the body includes an exposing hole that passes through the support body portion to expose the communication hole and the back extension region, and a dimension of the exposing hole gradually reduces toward the support plate part.

2. The physical quantity measurement device according to claim 1, further comprising:

a filter unit that is superposed on a plate surface of the support plate part opposite to the physical quantity detector so as to cover the communication hole on a side opposite to the recessed part, and to allow the fluid to flow in the recessed part through the communication hole.

3. The physical quantity measurement device according to claim 1, wherein the peripheral edge portion of the hole opening is spaced apart inwardly from the peripheral edge portion of the recess opening as well as a peripheral edge portion of the membrane part.

4. The physical quantity measurement device according to claim 1, wherein a minimum separation distance between portions of the peripheral edge portion of the hole opening facing each other with respect to a center of the hole opening is larger than a thickness dimension of the support plate part.

5. The physical quantity measurement device according to claim 1, wherein the communication hole is a circular hole having a circular cross-sectional shape, and the communication hole has an inner diameter larger than the thickness dimension of the support plate part.

6. The physical quantity measurement device according to claim 1, wherein the recessed part has an inner wall surface extending from the recess opening along a centerline of the recessed part.

7. The physical quantity measurement device according to claim 1, wherein:

the physical quantity measurement device further comprises: a housing having a passage flow path and the measurement flow path, the passage flow path having an inflow port that allows the fluid to flow in the passage flow path and an outflow port that allows the fluid to flow out from the passage flow path, the measurement flow path branches from a portion of the passage flow path between the inflow port and the outflow port, and the physical quantity detector is disposed in the measurement flow path.

8. The physical quantity measurement device according to claim 7, wherein the measurement flow path has a measurement path inlet at a boundary between the measurement flow path and the passage flow path, and a measurement path outlet at a position separate from the outflow port.

9. The physical quantity measurement device according to claim 7, wherein the housing has the inflow port at an end and the outflow port at an opposite end, and the passage flow path extends substantially straight from the inflow port to the outflow port.

10. A method for manufacturing a physical quantity measurement device, which measures a physical quantity of a fluid, the method comprising:

forming a plate-shaped physical quantity detector for detecting the physical quantity of the fluid flowing in a measurement flow path, to include a recessed part defining a recess recessed from a back surface, which is a surface of the physical quantity detector, and a membrane part defining a bottom surface of the recessed part in the physical quantity detector and being provided with a detection element for detecting the physical quantity of the fluid;

forming a communication hole passing through a support plate part for supporting the physical quantity detector by punching the support plate part from a back plate surface, which is a plate surface of the support plate part opposite to the physical quantity detector;

attaching the physical quantity detector to a front plate surface which is a plate surface of the support plate part opposite to the back plate surface so that the communication hole is in communication with the recessed part in a state where a peripheral edge portion of a hole opening, which is an end of the communication hole adjacent to the support plate part, is spaced apart inwardly from a peripheral edge portion of a recess opening, which is an end of the recessed part adjacent to the support plate part;

attaching a filter unit for allowing the fluid to flow in the recessed part through the communication hole to the back plate surface of the support plate part so as to cover the communication hole;

preparing a front mold unit used for molding a detection body portion, the detection body portion covering a front surface of the physical quantity detector opposite to the back surface in a state of exposing the membrane part and a front extension region extending from the membrane part in the front surface of the physical quantity detector;

preparing a back mold unit used for molding a support body portion, the support body portion covering a back plate surface of the support plate part opposite to the physical quantity detector in a state of exposing the communication hole and a back extension region extending from the communication hole in the back plate surface of the support plate part; and mounting the front mold unit and the back mold unit to the support plate part to which the physical quantity detector and the filter unit have been attached, so that a front molding portion of the front mold unit for exposing the membrane part and the front extension region is pressed against the front extension region, and a back molding portion of the back mold unit for exposing the communication hole and the back extension region is pressed against the back extension region.

11. The method for manufacturing a physical quantity measurement device according to claim 10, comprising:
molding the back mold unit so as to cover the back plate surface of the support plate part in a state of exposing the communication hole, as well as to cover the peripheral edge portion of the filter unit, after the attaching the filter unit to the back plate surface of the support plate part.

12. The method for manufacturing a physical quantity measurement device according to claim 10, comprising:
molding the back mold unit so as to cover the back plate surface of the support plate part in a state of exposing the back extension region of the back plate surface of the support plate part extending from the communication hole, wherein
the filter unit is attached to the back extension region after the back mold unit is molded.

* * * * *